United States Patent
Zhang et al.

(10) Patent No.: US 10,735,056 B2
(45) Date of Patent: Aug. 4, 2020

(54) CHANNEL QUALITY INDEX MEASUREMENT METHOD AND APPARATUS

(71) Applicant: Huawei Technologies Co., Ltd., Shenzhen (CN)

(72) Inventors: Ruiqi Zhang, Beijing (CN); Bingyu Qu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/126,331

(22) Filed: Sep. 10, 2018

(65) Prior Publication Data

US 2019/0007108 A1    Jan. 3, 2019

Related U.S. Application Data

(63) Continuation of application No. PCT/CN2016/076116, filed on Mar. 11, 2016.

(51) Int. Cl.
*H04B 7/0417* (2017.01)
*H04W 24/10* (2009.01)
(Continued)

(52) U.S. Cl.
CPC ......... *H04B 7/0417* (2013.01); *H04B 7/0452* (2013.01); *H04B 7/0486* (2013.01);
(Continued)

(58) Field of Classification Search
CPC ... H04B 7/0417; H04B 7/0452; H04L 7/0486; H04L 7/0632; H04L 7/0658
See application file for complete search history.

(56) References Cited

U.S. PATENT DOCUMENTS

| | | | |
|---|---|---|---|
| 2014/0247808 A1 | 9/2014 | Zhang et al. | |
| 2014/0301238 A1* | 10/2014 | Chun | H04L 5/0048 370/252 |

(Continued)

FOREIGN PATENT DOCUMENTS

| | | |
|---|---|---|
| CN | 101754463 A | 6/2010 |
| CN | 102255689 A | 11/2011 |

(Continued)

OTHER PUBLICATIONS

International Search Report for PCT/CN2016/076116, dated Sep. 14, 2017 (Year: 2017).*

(Continued)

*Primary Examiner* — Benjamin H Elliott, IV
(74) *Attorney, Agent, or Firm* — Slater Matsil, LLP

(57) ABSTRACT

Embodiments of the present invention disclose a channel quality index measurement method and apparatus. The method includes: determining, by a base station, a target CSI-RS on each of time-frequency resources corresponding to resource numbers of a terminal, where the target CSI-RS is a precoded CSI-RS, and the time-frequency resource is a resource element used to transmit the CSI-RS or the target CSI-RS; sending, by the base station, the target CSI-RS on each of the time-frequency resources corresponding to the resource numbers to the terminal on the time-frequency resource; sending, by the base station to the terminal, indication information used to indicate the resource numbers of the terminal; and receiving, by the base station, a CQI that is sent by the terminal and that is used to indicate channel quality.

10 Claims, 8 Drawing Sheets

(51) Int. Cl.
H04B 7/0452 (2017.01)
H04B 7/0456 (2017.01)
H04B 7/06 (2006.01)
(52) U.S. Cl.
CPC ......... *H04B 7/0632* (2013.01); *H04B 7/0658* (2013.01); *H04W 24/10* (2013.01)

(56) References Cited

U.S. PATENT DOCUMENTS

| | | | | |
|---|---|---|---|---|
| 2014/0334408 | A1* | 11/2014 | Gao | H04W 72/042 370/329 |
| 2015/0023311 | A1 | 1/2015 | Frenne et al. | |
| 2015/0063177 | A1* | 3/2015 | Kim | H04B 7/024 370/280 |
| 2016/0182208 | A1 | 6/2016 | Yi et al. | |
| 2016/0330004 | A1* | 11/2016 | Kim | H04L 5/0048 |
| 2016/0359538 | A1* | 12/2016 | Onggosanusi | H04B 7/0469 |
| 2017/0149480 | A1* | 5/2017 | Kakishima | H04J 11/00 |
| 2017/0180194 | A1* | 6/2017 | Noh | H04L 5/0023 |
| 2017/0202014 | A1* | 7/2017 | Moon | H04B 7/0626 |
| 2017/0310371 | A1* | 10/2017 | Zhang | H04L 1/16 |
| 2018/0175983 | A1* | 6/2018 | Yum | H04L 5/0057 |
| 2018/0241523 | A1* | 8/2018 | Noh | H04L 5/0048 |
| 2018/0278317 | A1* | 9/2018 | Onggosanusi | H04L 1/0027 |
| 2019/0007108 | A1* | 1/2019 | Zhang | H04B 7/0417 |
| 2020/0067671 | A1* | 2/2020 | Grant | H04L 5/0044 |

FOREIGN PATENT DOCUMENTS

| | | |
|---|---|---|
| CN | 103891231 A | 6/2014 |
| CN | 105337683 A | 2/2016 |
| CN | 105340316 A | 2/2016 |
| JP | 2012513176 A | 6/2012 |
| JP | 2015531211 A | 10/2015 |
| JP | 2016021769 A | 2/2016 |
| WO | 2012124552 A1 | 9/2012 |
| WO | 2015054879 A1 | 4/2015 |
| WO | 2016013351 A1 | 6/2017 |

OTHER PUBLICATIONS

Huawei et al., "Way Forward on CSI reporting without PMI," 3GPP TSG RAN WG1 #82bis, R1-156273, Malmö, Sweden, Oct. 5-9, 2015, 2 pages.

Nokia Networks, "Enhancements related to precoded CSI-RS based schemes," 3GPP TSG RAN WG1 Meeting #80bis, R1-151911, Belgrade, Serbia, Apr. 20-24, 2015, 2 pages.

LG Electronics, "Beamformed CSI-RS related enhancements based on the identified approaches," 3GPP TSG RAN WG1 Meeting #82, R1-154274, Beijing, China, Aug. 24-28, 2015, 8 pages.

NTT Docomo, "Views on CSI measurement for NR," 3GPP TSG RAN WG1 Meeting 91, R1-1720801, Reno, USA, Nov. 27-Dec. 1, 2017, 12 pages.

Huawei et al., "Discussion on efficient utilization of BF CSI-RS," 3GPP TSG RAN WG1 Meeting #85, R1-164858, Nanjing, China, May 23-27, 2016, 4 pages.

QUALCOMM Incorporated, "Details of MU-CSI feedback," 3GPP TSG-RAN WG1 #73, R1-132484, May 20-24, 2013, Fukuoka, Japan, 6 pages.

NTT Docomo, "Views on CSI Reporting for Class B," 3GPP TSG RAN WG1 Meeting #82bis, R1-155767, Malmö, Sweden, Oct. 5-9, 2015, 4 pages.

* cited by examiner

CONT.
FROM
FIG. 1A

| The terminal determines target information from the information based on the resource number of the terminal, where the target information is received information that is sent by the base station to the terminal on the time-frequency resource corresponding to the resource number of the terminal | 107 |

| The terminal measures channel quality based on the target information, and determines a CQI based on the measured channel quality | 108 |

| The terminal sends the CQI to the base station | 109 |

| The base station receives the CQI sent by the terminal | 110 |

CHANNEL QUALITY INDEX MEASUREMENT METHOD AND APPARATUS

CROSS-REFERENCE TO RELATED APPLICATIONS

This application is a continuation of International Application No. PCT/CN2016/076116, filed on Mar. 11, 2016, the disclosure of which is hereby incorporated by reference in its entirety.

TECHNICAL FIELD

The present invention relates to the field of communications technologies, and in particular, to a channel quality index (CQI) measurement method and apparatus.

BACKGROUND

A multiple-input multiple-output (MIMO) technology is widely used in a Long Term Evolution (LTE) system. In a MIMO system, a precoding technology is usually used to improve signal transmission quality/increase a signal transmission rate. In an LTE system in a frequency division multiplexing (FDD) mode, a terminal determines downlink channel information based on a received channel state information-reference signal (CSI-RS) sent by a base station, and feeds back the downlink channel information to the base station. The downlink channel information includes a precoding matrix index (PMI), a rank index (RI), and a CQI. Currently, the terminal determines the downlink channel information based on an assumption of single user MIMO (SU-MIMO). After receiving downlink channel information sent by a plurality of terminals, if the base station determines to select the plurality of terminals to form multi-user MIMO (MU-MIMO), to reduce interference between the plurality of terminals, based on the downlink channel information fed back by each terminal and by using a preset algorithm (for example, a zero-forcing algorithm), the base station reconstructs a precoding matrix for the terminal, redetermines a rank of a channel, and allocates a corresponding CSI-RS port to the terminal. Because a CQI fed back by the terminal is based on the assumption of SU-MIMO, the CQI does not match actual downlink channel quality in a MU-MIMO scenario.

To resolve this problem, the base station precodes the CSI-RS based on the precoding matrix reconstructed for the terminal, and sends a precoded CSI-RS to the terminal. The terminal remeasures a CQI based on the CSI-RS, and feeds back the CQI to the base station. In this case, when remeasuring the CQI based on the CSI-RS, the base station needs to measure channel quality of a channel corresponding to each CSI-RS port (in other words, the terminal needs to measure, based on received information on a time-frequency resource corresponding to each CSI-RS port, channel quality of a channel corresponding to the CSI-RS port), and feed back channel quality of channels corresponding to all CSI-RS ports to the base station. However, actually, the base station needs only channel quality of a channel corresponding to a CSI-RS port corresponding to the terminal. Consequently, an uplink resource is wasted.

SUMMARY

Embodiments of the present invention provide a channel quality index measurement method and apparatus, to reduce resource consumption of a terminal.

To achieve the foregoing objectives, the following technical solutions are used in the embodiments of the present invention:

According to a first aspect, a CQI measurement method is provided. The method includes determining, by a base station, a target CSI-RS on each of time-frequency resources corresponding to resource numbers of a terminal, where the target CSI-RS is a precoded CSI-RS, and the time-frequency resource is a resource element used to transmit the CSI-RS or the target CSI-RS. The method also includes sending, by the base station, the target CSI-RS on each of the time-frequency resources corresponding to the resource numbers to the terminal on the time-frequency resource. The method also includes sending, by the base station to the terminal, indication information used to indicate the resource numbers of the terminal. The method also includes receiving, by the base station, a CQI that is sent by the terminal and that is used to indicate channel quality.

Optionally, the sending, by the base station to the terminal, indication information includes: sending, by the base station, the indication information to the terminal on a PDCCH, where resource numbers indicated by the indication information sent by the base station to the terminal on PDCCHs in different subframes are the same or different.

The terminal may quickly determine information sent by the base station on the PDCCH. Therefore, the base station may send the indication information in each subframe, so that the terminal measures channel quality based on a resource number allocated by the base station to the terminal.

Optionally, a quantity of resource numbers indicated by the indication information is the same as a value of a first rank, and the method further includes: receiving, by the base station, an RI sent by the terminal, where the RI is an RI determined by the terminal based on a second rank that is measured by the terminal based on information received on each of the time-frequency resources corresponding to the resource numbers indicated by the indication information; determining, by the base station, the second rank based on the RI; and precoding, by the base station by using a precoding matrix corresponding to the terminal, a data stream sent to the terminal, and sending the data stream on a data port, where a quantity of data ports is the same as the value of the first rank, a layer quantity of the data stream is the same as a value of the second rank, the second rank is less than or equal to the first rank, and the first rank is an initial rank determined by the base station for the terminal.

Because of a high correlation between a rank and a CQI, after the terminal feeds back a CQI again, if the base station still sends data to the terminal based on the first rank, the terminal may not correctly decode the data. Therefore, the terminal determines the second rank based on target information, and feeds back the RI to the base station. The base station finally determines the second rank as a rank corresponding to the terminal, thereby ensuring that the terminal can correctly decode the data.

Optionally, the resource numbers are resource numbers of R resources included in a resource pool, one resource is corresponding to one resource number, R is an integer greater than or equal to 2, and the resource pool is a resource pool defined by the base station, and the method further includes: sending, by the base station, the resource pool to the terminal by using RRC signaling.

Optionally, the resource number is a target CSI-RS port number, a row number of an orthogonal matrix, or a column number of an orthogonal matrix, a combination of N resource elements and one code whose length is N is corresponding to one target CSI-RS port or one resource element is corresponding to one target CSI-RS port, and N is an integer greater than or equal to 2.

Optionally, the determining, by a base station, a target CSI-RS on each of time-frequency resources corresponding to resource numbers of a terminal includes: determining, by the base station based on the resource number, a CSI-RS corresponding to the resource number, and the precoding matrix, the target CSI-RS sent on each of the time-frequency resources corresponding to the resource numbers.

Optionally, the determining, by the base station based on the resource number, a CSI-RS corresponding to the resource number, and the precoding matrix, the target CSI-RS sent on each of the time-frequency resources corresponding to the resource numbers includes: determining, by the base station, the first rank and the precoding matrix of the terminal; allocating, by the base station, the resource numbers to the terminal based on the first rank, where the quantity of resource numbers is the same as the value of the first rank; and performing, by the base station by using a code corresponding to the resource number, spectrum spreading on the CSI-RS corresponding to the resource number; and precoding, by using the precoding matrix, each CSI-RS obtained after spectrum spreading, to obtain the target CSI-RS sent on each of the time-frequency resources corresponding to the resource numbers, where when the resource number is a target CSI-RS port number, the code corresponding to the resource number is a code whose length is N and that is corresponding to the target CSI-RS port; or when the resource number is a row number of an orthogonal matrix, the code corresponding to the resource number is a row element corresponding to the row number; or when the resource number is a column number of an orthogonal matrix, the code corresponding to the resource number is a column element corresponding to the column number.

Optionally, the resource numbers are the resource numbers of the R resources included in the resource pool, the indication information includes R bits, an $r^{th}$ bit in the R bits is used to indicate whether to allocate an $r^{th}$ resource in the R resources to the terminal, R is an integer greater than or equal to 2, and r is an integer greater than or equal to 1 and less than or equal to R; or the indication information includes 3 bits, and the resource numbers indicated by the indication information are different when values of the 3 bits are different; or the indication information includes 4 bits, and the resource numbers indicated by the indication information are different when values of the 4 bits are different.

According to a second aspect, a CQI measurement method is provided. The method includes receiving, by a terminal, information sent by a base station on each time-frequency resource. The method also includes receiving, by the terminal, indication information that is sent by the base station and that is used to indicate resource numbers of the terminal to the terminal. The method also includes determining, by the terminal, the resource numbers of the terminal based on the indication information. The method also includes determining, by the terminal, target information from the information based on the resource number of the terminal, where the target information is received information that is sent by the base station to the terminal on a time-frequency resource corresponding to the resource number of the terminal, the time-frequency resource is a resource element used to transmit a CSI-RS or a target CSI-RS, and the target CSI-RS is a precoded CSI-RS. The method also includes measuring, by the terminal, channel quality based on the target information, and determining a CQI based on the measured channel quality. The method also includes sending, by the terminal, the CQI to the base station.

Optionally, the receiving, by the terminal, indication information sent by the base station includes: receiving, by the terminal on a PDCCH, the indication information sent by the base station, where resource numbers indicated by the indication information that is sent by the base station and that is received by the terminal on PDCCHs in different subframes are the same or different.

The terminal may quickly determine information sent by the base station on the PDCCH. Therefore, the base station may send the indication information in each subframe, so that the terminal measures channel quality based on a resource number allocated by the base station to the terminal.

Optionally, a quantity of resource numbers indicated by the indication information is the same as a value of a first rank, and after the determining, by the terminal, the resource numbers of the terminal based on the indication information, the method further includes: determining, by the terminal, that the quantity of resource numbers is the value of the first rank, where the first rank is an initial rank determined by the base station for the terminal; measuring, by the terminal, a second rank based on the target information and the first rank, and determining an RI based on the measured second rank, where the second rank corresponding to the RI is less than or equal to the first rank; and sending, by the terminal, the RI to the base station.

Because of a high correlation between a rank and a CQI, after the terminal feeds back a CQI again, if the base station still sends data to the terminal based on the first rank, the terminal may not correctly decode the data. Therefore, the terminal determines the second rank based on the target information, and feeds back the RI to the base station. The base station finally determines the second rank as a rank corresponding to the terminal, thereby ensuring that the terminal can correctly decode the data.

Optionally, the resource numbers are resource numbers of R resources included in a resource pool, one resource is corresponding to one resource number, and R is an integer greater than or equal to 2, and the method further includes: receiving, by the terminal by using RRC signaling, the resource pool sent by the base station.

Optionally, the resource number is a target CSI-RS port number, a row number of an orthogonal matrix, or a column number of an orthogonal matrix, a combination of N resource elements and one code whose length is N is corresponding to one target CSI-RS port or one resource element is corresponding to one target CSI-RS port, and N is an integer greater than or equal to 2.

Optionally, the determining, by the terminal, target information from the information based on the resource number of the terminal includes: determining, by the terminal, the information received on the time-frequency resource corresponding to the resource number of the terminal; and despreading, by the terminal by using a code corresponding to the resource number of the terminal, the information received on the time-frequency resource corresponding to the resource number of the terminal, to obtain the target information, where when the resource number is a target CSI-RS port number, the code corresponding to the resource number is a code whose length is N and that is corresponding to the target CSI-RS port; or when the resource number is a row number of an orthogonal matrix, the code corresponding to the resource number is a row element corresponding to the row number; or when the resource number is a column number of an orthogonal matrix, the code corresponding to the resource number is a column element corresponding to the column number.

Optionally, the resource numbers are the resource numbers of the R resources included in the resource pool, and the determining, by the terminal, the resource numbers of the terminal based on the indication information includes: determining, by the terminal, the resource numbers of the terminal based on R bits included in the indication information, where an $r^{th}$ bit in the R bits is used to indicate whether to allocate an $r^{th}$ resource in the R resources to the terminal, R is an integer greater than or equal to 2, and r is an integer greater than or equal to 1 and less than or equal to R; or determining, by the terminal, the resource numbers of the terminal based on values of 3 bits included in the indication information; or determining, by the terminal, the resource numbers of the terminal based on values of 4 bits included in the indication information.

According to a third aspect, a CQI measurement apparatus is provided. The apparatus includes a first determining unit, configured to determine a target CSI-RS on each of time-frequency resources corresponding to resource numbers of a terminal, where the target CSI-RS is a precoded CSI-RS, and the time-frequency resource is a resource element used to transmit the CSI-RS or the target CSI-RS. The apparatus also includes a first sending unit, configured to send the target CSI-RS on each of the time-frequency resources corresponding to the resource numbers to the terminal on the time-frequency resource. The apparatus also includes a second sending unit, configured to send, to the terminal, indication information used to indicate the resource numbers of the terminal. The apparatus also includes a first receiving unit, configured to receive a CQI that is sent by the terminal and that is used to indicate channel quality.

Optionally, the second sending unit is specifically configured to: send the indication information to the terminal on a PDCCH, where resource numbers indicated by the indication information sent by the second sending unit to the terminal on PDCCHs in different subframes are the same or different.

The terminal may quickly determine information sent by a base station on the PDCCH. Therefore, the base station may send the indication information in each subframe, so that the terminal measures channel quality based on a resource number allocated by the base station to the terminal.

Optionally, the apparatus further includes a second receiving unit, a second determining unit, a precoding unit, and a third sending unit, where the second receiving unit is configured to receive an RI sent by the terminal, where the RI is an RI determined by the terminal based on a second rank that is measured by the terminal based on information received on each of the time-frequency resources corresponding to the resource numbers indicated by the indication information; the second determining unit is configured to determine the second rank based on the RI; the precoding unit is configured to precode, by using a precoding matrix corresponding to the terminal, a data stream sent to the terminal; and the third sending unit is configured to send the data stream on a data port, where a quantity of data ports is the same as a value of a first rank, a layer quantity of the data stream is the same as a value of the second rank, the second rank is less than or equal to the first rank, and the first rank is an initial rank determined by a base station for the terminal.

Because of a high correlation between a rank and a CQI, after the terminal feeds back a CQI again, if the base station still sends data to the terminal based on the first rank, the terminal may not correctly decode the data. Therefore, the terminal determines the second rank based on target information, and feeds back the RI to the base station. The base station finally determines the second rank as a rank corresponding to the terminal, thereby ensuring that the terminal can correctly decode the data.

Optionally, the apparatus further includes a fourth sending unit, where the fourth sending unit is configured to send a resource pool to the terminal by using RRC signaling, where the resource numbers are resource numbers of R resources included in the resource pool, one resource is corresponding to one resource number, and R is an integer greater than or equal to 2.

Optionally, the resource number is a target CSI-RS port number, a row number of an orthogonal matrix, or a column number of an orthogonal matrix, a combination of N resource elements and one code whose length is N is corresponding to one target CSI-RS port or one resource element is corresponding to one target CSI-RS port, and N is an integer greater than or equal to 2.

Optionally, the first determining unit is specifically configured to: determine, based on the resource number, a CSI-RS corresponding to the resource number, and the precoding matrix, the target CSI-RS sent on each of the time-frequency resources corresponding to the resource numbers.

Optionally, the first determining unit is specifically configured to: determine the first rank and the precoding matrix of the terminal; allocate the resource numbers to the terminal based on the first rank, where a quantity of resource numbers is the same as the value of the first rank; and perform, by using a code corresponding to the resource number, spectrum spreading on the CSI-RS corresponding to the resource number; and precode, by using the precoding matrix, each CSI-RS obtained after spectrum spreading, to obtain the target CSI-RS sent on each of the time-frequency resources corresponding to the resource numbers, where when the resource number is a target CSI-RS port number, the code corresponding to the resource number is a code whose length is N and that is corresponding to the target CSI-RS port; or when the resource number is a row number of an orthogonal matrix, the code corresponding to the resource number is a row element corresponding to the row number; or when the resource number is a column number of an orthogonal matrix, the code corresponding to the resource number is a column element corresponding to the column number.

Optionally, the resource numbers are the resource numbers of the R resources included in the resource pool, the indication information includes R bits, an $r^{th}$ bit in the R bits is used to indicate whether to allocate an $r^{th}$ resource in the R resources to the terminal, R is an integer greater than or equal to 2, and r is an integer greater than or equal to 1 and less than or equal to R; or the indication information includes 3 bits, and the resource numbers indicated by the indication information are different when values of the 3 bits are different; or the indication information includes 4 bits, and the resource numbers indicated by the indication information are different when values of the 4 bits are different.

According to a fourth aspect, a CQI measurement apparatus is provided. The apparatus includes a first receiving unit, configured to receive information sent by a base station on each time-frequency resource. The apparatus also includes a second receiving unit, configured to receive indication information that is sent by the base station and that is used to indicate resource numbers of a terminal to the terminal. The apparatus also includes a first determining unit, configured to determine the resource numbers of the terminal based on the indication information. The apparatus also includes a second determining unit, configured to determine target information from the information based on the resource number of the terminal, where the target information is received information that is sent by the base station to the terminal on a time-frequency resource corresponding to the resource number of the terminal, the time-frequency resource is a resource element used to transmit a CSI-RS or a target CSI-RS, and the target CSI-RS is a precoded CSI-RS. The apparatus also includes a first execution unit, configured to: measure channel quality based on the target information, and determine a CQI based on the measured channel quality. The apparatus also includes a first sending unit, configured to send the CQI to the base station.

Optionally, the second receiving unit is specifically configured to: receive, on a PDCCH, the indication information sent by the base station, where resource numbers indicated by the indication information that is sent by the base station and that is received by the second receiving unit on PDCCHs in different subframes are the same or different.

The terminal may quickly determine information sent by the base station on the PDCCH. Therefore, the base station may send the indication information in each subframe, so that the terminal measures channel quality based on a resource number allocated by the base station to the terminal.

Optionally, the apparatus further includes a third determining unit, a second execution unit, and a second sending unit, where the third determining unit is configured to determine that a quantity of resource numbers is a value of a first rank, where the first rank is an initial rank determined by the base station for the terminal; the second execution unit is configured to: measure a second rank based on the target information and the first rank, and determine an RI based on the measured second rank, where the second rank corresponding to the RI is less than or equal to the first rank; and the second sending unit is configured to send the RI to the base station.

Because of a high correlation between a rank and a CQI, after the terminal feeds back a CQI again, if the base station still sends data to the terminal based on the first rank, the terminal may not correctly decode the data. Therefore, the terminal determines the second rank based on the target information, and feeds back the RI to the base station. The base station finally determines the second rank as a rank corresponding to the terminal, thereby ensuring that the terminal can correctly decode the data.

Optionally, the apparatus further includes a third receiving unit, configured to: receive, by using RRC signaling, a resource pool sent by the base station, where the resource numbers are resource numbers of R resources included in the resource pool, one resource is corresponding to one resource number, and R is an integer greater than or equal to 2.

Optionally, the resource number is a target CSI-RS port number, a row number of an orthogonal matrix, or a column number of an orthogonal matrix, a combination of N resource elements and one code whose length is N is corresponding to one target CSI-RS port or one resource element is corresponding to one target CSI-RS port, and N is an integer greater than or equal to 2.

Optionally, the second determining unit is specifically configured to: determine the information received on the time-frequency resource corresponding to the resource number of the terminal; and despread, by using a code corresponding to the resource number of the terminal, the information received on the time-frequency resource corresponding to the resource number of the terminal, to obtain the target information, where when the resource number is a target CSI-RS port number, the code corresponding to the resource number is a code whose length is N and that is corresponding to the target CSI-RS port; or when the resource number is a row number of an orthogonal matrix, the code corresponding to the resource number is a row element corresponding to the row number; or when the resource number is a column number of an orthogonal matrix, the code corresponding to the resource number is a column element corresponding to the column number.

Optionally, the first determining unit is specifically configured to: determine the resource numbers of the terminal based on R bits included in the indication information, where an $r^{th}$ bit in the R bits is used to indicate whether to allocate an $r^{th}$ resource in the R resources to the terminal, R is an integer greater than or equal to 2, and r is an integer greater than or equal to 1 and less than or equal to R; or determine the resource numbers of the terminal based on values of 3 bits included in the indication information; or determine the resource numbers of the terminal based on values of 4 bits included in the indication information.

According to a fifth aspect, a CQI measurement apparatus is provided. The apparatus includes a memory, a processor, a transmitter, and a receiver. The memory is configured to store code, and the processor performs the following actions based on the code: determining a target CSI-RS on each of time-frequency resources corresponding to resource numbers of a terminal, where the target CSI-RS is a precoded CSI-RS, and the time-frequency resource is a resource element used to transmit the CSI-RS or the target CSI-RS. The transmitter is configured to send the target CSI-RS on each of the time-frequency resources corresponding to the resource numbers to the terminal on the time-frequency resource. The transmitter is further configured to send, to the terminal, indication information used to indicate the resource numbers of the terminal. The receiver is configured to receive a CQI that is sent by the terminal and that is used to indicate channel quality.

Optionally, the transmitter is specifically configured to: send the indication information to the terminal on a PDCCH, where resource numbers indicated by the indication information sent by the transmitter to the terminal on PDCCHs in different subframes are the same or different.

The terminal may quickly determine information sent by a base station on the PDCCH. Therefore, the base station may send the indication information in each subframe, so that the terminal measures channel quality based on a resource number allocated by the base station to the terminal.

Optionally, the receiver is further configured to receive an RI sent by the terminal, where the RI is an RI determined by the terminal based on a second rank that is measured by the terminal based on information received on each of the time-frequency resources corresponding to the resource numbers indicated by the indication information; the processor is further configured to determine the second rank based on the RI; the processor is further configured to precode, by using a precoding matrix corresponding to the terminal, a data stream sent to the terminal; and the transmitter is further configured to send the data stream on a data port, where a quantity of data ports is the same as a value of a first rank, a layer quantity of the data stream is the same as a value of the second rank, the second rank is less than or equal to the first rank, and the first rank is an initial rank determined by a base station for the terminal.

Because of a high correlation between a rank and a CQI, after the terminal feeds back a CQI again, if the base station still sends data to the terminal based on the first rank, the terminal may not correctly decode the data. Therefore, the terminal determines the second rank based on target information, and feeds back the RI to the base station. The base station finally determines the second rank as a rank corresponding to the terminal, thereby ensuring that the terminal can correctly decode the data.

Optionally, the transmitter is further configured to: send a resource pool to the terminal by using RRC signaling, where the resource numbers are resource numbers of R resources included in the resource pool, one resource is corresponding to one resource number, and R is an integer greater than or equal to 2.

Optionally, the resource number is a target CSI-RS port number, a row number of an orthogonal matrix, or a column number of an orthogonal matrix, a combination of N resource elements and one code whose length is N is corresponding to one target CSI-RS port or one resource element is corresponding to one target CSI-RS port, and N is an integer greater than or equal to 2.

Optionally, the processor is specifically configured to: determine, based on the resource number, a CSI-RS corresponding to the resource number, and the precoding matrix, the target CSI-RS sent on each of the time-frequency resources corresponding to the resource numbers.

Optionally, the processor is specifically configured to: determine the first rank and the precoding matrix of the terminal; allocate the resource numbers to the terminal based on the first rank, where a quantity of resource numbers is the same as the value of the first rank; and perform, by using a code corresponding to the resource number, spectrum spreading on the CSI-RS corresponding to the resource number; and precode, by using the precoding matrix, each CSI-RS obtained after spectrum spreading, to obtain the target CSI-RS sent on each of the time-frequency resources corresponding to the resource numbers, where when the resource number is a target CSI-RS port number, the code corresponding to the resource number is a code whose length is N and that is corresponding to the target CSI-RS port; or when the resource number is a row number of an orthogonal matrix, the code corresponding to the resource number is a row element corresponding to the row number; or when the resource number is a column number of an orthogonal matrix, the code corresponding to the resource number is a column element corresponding to the column number.

Optionally, the resource numbers are the resource numbers of the R resources included in the resource pool, the indication information includes R bits, an $r^{th}$ bit in the R bits is used to indicate whether to allocate an $r^{th}$ resource in the R resources to the terminal, R is an integer greater than or equal to 2, and r is an integer greater than or equal to 1 and less than or equal to R; or the indication information includes 3 bits, and the resource numbers indicated by the indication information are different when values of the 3 bits are different; or the indication information includes 4 bits, and the resource numbers indicated by the indication information are different when values of the 4 bits are different.

According to a sixth aspect, a CQI measurement apparatus is provided. The apparatus includes a receiver, a memory, a processor, and a transmitter, where the receiver is configured to receive information sent by a base station on each time-frequency resource; the receiver is further configured to receive indication information that is sent by the base station and that is used to indicate resource numbers of a terminal to the terminal; the memory is configured to store code, and the processor performs the following actions based on the code: determining the resource numbers of the terminal based on the indication information; determining target information from the information based on the resource number of the terminal, where the target information is received information that is sent by the base station to the terminal on a time-frequency resource corresponding to the resource number of the terminal, the time-frequency resource is a resource element used to transmit a CSI-RS or a target CSI-RS, and the target CSI-RS is a precoded CSI-RS; measuring channel quality based on the target information, and determining a CQI based on the measured channel quality; and the transmitter is configured to send the CQI to the base station.

Optionally, the receiver is specifically configured to: receive, on a PDCCH, the indication information sent by the base station, where resource numbers indicated by the indication information that is sent by the base station and that is received by the receiver on PDCCHs in different subframes are the same or different.

The terminal may quickly determine information sent by the base station on the PDCCH. Therefore, the base station may send the indication information in each subframe, so that the terminal measures channel quality based on a resource number allocated by the base station to the terminal.

Optionally, the processor is further configured to determine that a quantity of resource numbers is a value of a first rank, where the first rank is an initial rank determined by the base station for the terminal; the processor is further configured to: measure a second rank based on the target information and the first rank, and determine an RI based on the measured second rank, where the second rank corresponding to the RI is less than or equal to the first rank; and the transmitter is further configured to send the RI to the base station.

Because of a high correlation between a rank and a CQI, after the terminal feeds back a CQI again, if the base station still sends data to the terminal based on the first rank, the terminal may not correctly decode the data. Therefore, the terminal determines the second rank based on the target information, and feeds back the RI to the base station. The base station finally determines the second rank as a rank corresponding to the terminal, thereby ensuring that the terminal can correctly decode the data.

Optionally, the receiver is further configured to: receive, by using RRC signaling, a resource pool sent by the base station, where the resource numbers are resource numbers of R resources included in the resource pool, one resource is corresponding to one resource number, and R is an integer greater than or equal to 2.

Optionally, the resource number is a target CSI-RS port number, a row number of an orthogonal matrix, or a column number of an orthogonal matrix, a combination of N resource elements and one code whose length is N is corresponding to one target CSI-RS port or one resource element is corresponding to one target CSI-RS port, and N is an integer greater than or equal to 2.

Optionally, the processor is specifically configured to: determine the information received on the time-frequency resource corresponding to the resource number of the terminal; and despread, by using a code corresponding to the resource number of the terminal, the information received on the time-frequency resource corresponding to the resource number of the terminal, to obtain the target information, where when the resource number is a target CSI-RS port number, the code corresponding to the resource number is a code whose length is N and that is corresponding to the target CSI-RS port; or when the resource number is a row number of an orthogonal matrix, the code corresponding to the resource number is a row element corresponding to the row number; or when the resource number is a column number of an orthogonal matrix, the code corresponding to the resource number is a column element corresponding to the column number.

Optionally, the processor is specifically configured to: determine the resource numbers of the terminal based on R bits included in the indication information, where an $r^{th}$ bit in the R bits is used to indicate whether to allocate an $r^{th}$ resource in the R resources to the terminal, R is an integer greater than or equal to 2, and r is an integer greater than or equal to 1 and less than or equal to R; or determine the resource numbers of the terminal based on values of 3 bits included in the indication information; or determine the resource numbers of the terminal based on values of 4 bits included in the indication information.

According to the method and the apparatus provided in the embodiments of the present invention, the base station dynamically indicates, to the terminal, the resource number allocated to the terminal. After receiving the resource number indicated by the base station, the terminal determines, based on the resource number, the target information from the information received on each time-frequency resource, measures the CQI based on the target information, and feeds back the CQI to the base station, instead of feeding back all measured CQIs to the base station after measuring the CQIs based on the information received on all time-frequency resources. Therefore, resource consumption of the terminal is greatly reduced.

BRIEF DESCRIPTION OF THE DRAWINGS

To describe the technical solutions in the embodiments of the present invention more clearly, the following briefly describes the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

FIG. 1A and FIG. 1B are a flowchart of a CQI measurement method according to an embodiment of the present invention;

DETAILED DESCRIPTION OF ILLUSTRATIVE EMBODIMENTS

The following describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

To make a person skilled in the art more clearly understand the technical solutions provided in the embodiments of the present invention, the prior art related to this application is first briefly described.

In a MIMO scenario, a base station sends a CSI-RS corresponding to each of a plurality of terminals to the terminal. Each of the plurality of terminals receives the CSI-RS sent by the base station, performs channel estimation based on an assumption of SU-MIMO and the CSI-RS, and feeds back, to the base station, a PMI, an initial RI (to distinguish an RI from an RI in the following, the RI is referred to as the initial RI herein), and an initial CQI (to distinguish a CQI from a CQI in the following, the CQI is referred to as the initial CQI herein) that are obtained through estimation. After receiving PMIs, initial RIs, and initial CQIs that are sent by the plurality of terminals, the base station determines, based on a principle that a MIMO system has a maximum throughput or a minimum interference degree, whether to form MU-MIMO by using N terminals in the plurality of terminals. If yes, the base station redetermines, based on PMIs, initial RIs, and initial CQIs that are fed back by the N terminals and by using a principle of eliminating or reducing interference between the N terminals, a precoding matrix and a rank that are corresponding to each of the N terminals for the terminal. In this case, the rank is a first rank in the following. A method provided in the embodiments of the present invention may be applied to the scenario, and an example in which the method is applied to the scenario is used in the following for description. However, it should be noted that the method provided in the embodiments of the present invention may also be applied to another scenario. For example, when the base station determines not to form MU-MIMO, the method may still be applied between the base station and the terminal. Therefore, the terminal in the embodiments of the present invention may be any one of a plurality of terminals that form MU-MIMO, or may be another terminal.

The method provided in the embodiments of the present invention is mainly applied to an LTE system and an LTE-Advanced system, and is mainly applied to a downlink MIMO scenario.

Figure 1A:
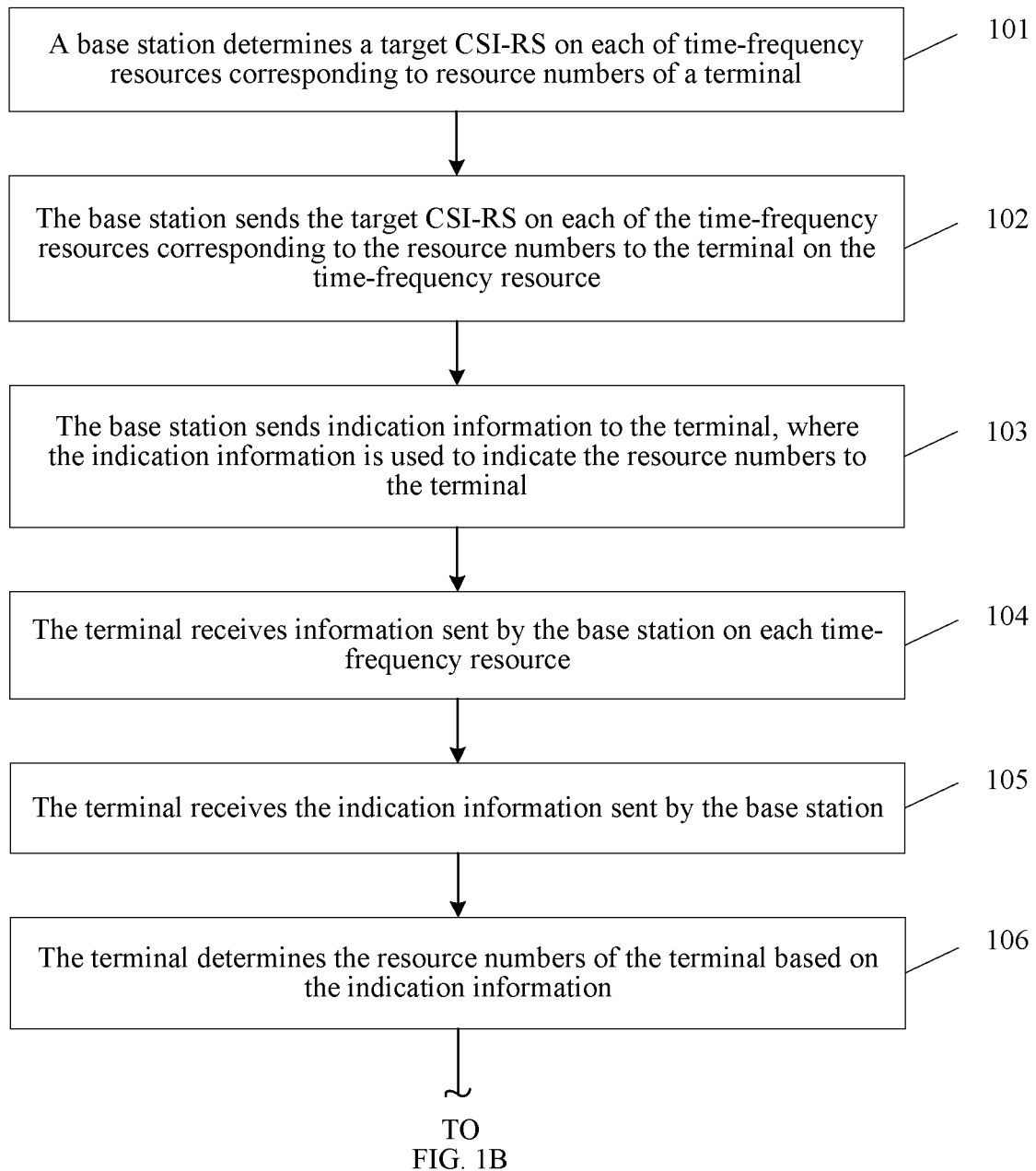

An embodiment of the present invention provides a CQI measurement method. As shown in FIG. 1A and FIG. 1B, the method includes the following steps.

101. A base station determines a target CSI-RS on each of time-frequency resources corresponding to resource numbers of a terminal.

The target CSI-RS is a precoded CSI-RS, and the time-frequency resource is a resource element used to transmit the CSI-RS or the target CSI-RS.

Specifically, the target CSI-RS may be a CSI-RS obtained after a CSI-RS corresponding to the resource number is precoded by using a precoding matrix corresponding to the terminal. The precoding matrix corresponding to the terminal may be determined by the base station. The CSI-RS corresponding to the resource number may be a preset CSI-RS, or may be a CSI-RS determined by the base station in another manner. However, it should be noted that the CSI-RS is well known to the base station and the terminal.

Optionally, the resource number is a target CSI-RS port number, a row number of an orthogonal matrix, or a column number of an orthogonal matrix, a combination of N resource elements and one code whose length is N is corresponding to one target CSI-RS port or one resource element is corresponding to one target CSI-RS port, and N is an integer greater than or equal to 2.

The target CSI-RS port number is a number of a target CSI-RS port, and numbers of target CSI-RS ports are used to distinguish between different target CSI-RS ports.

Because the combination of N resource elements and one code whose length is N is corresponding to one target CSI-RS port, when the resource number is a target CSI-RS port number, the resource number may indicate both a time domain resource and a code domain resource; and when the resource number is a row (or column) number of an orthogonal matrix, the base station may preset different time-frequency resources for different resource numbers, or time-frequency resources corresponding to different resource numbers are same time domain resources.

Figure 2:
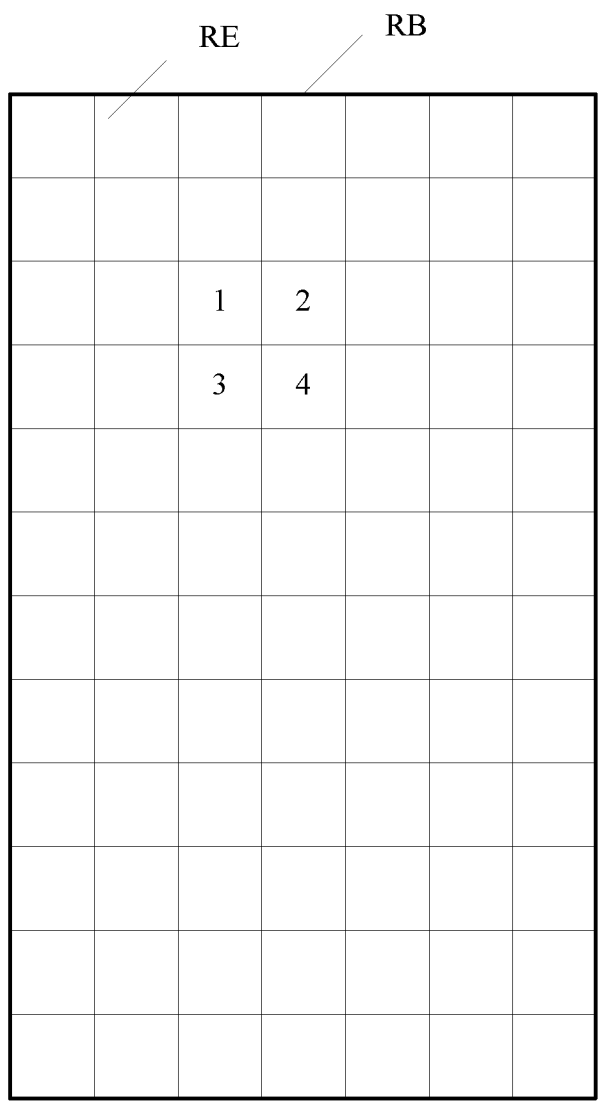
FIG. 2 is a schematic composition diagram of a PRB according to an embodiment of the present invention.

It should be noted that as shown in FIG. 2, a basic unit for air interface resource allocation in an LTE system and an LTE-Advanced system is a physical resource block (Physical Resource Block, PRB for short). One PRB includes 12 consecutive subcarriers in frequency domain, and includes seven consecutive orthogonal frequency division multiplexing (Orthogonal Frequency Division Multiplexing, OFDM for short) symbol periods in time domain. A resource including one OFDM symbol period and one subcarrier is referred to as one resource element (Resource Element, RE for short). In a plurality of REs included in one PRB, some REs are used to transmit data, and some REs are used to transmit a reference signal. For example, a resource element 1 (referred to as an RE 1 in the following), a resource element 2 (referred to as an RE 2 in the following), a resource element 3 (referred to as an RE 3 in the following), and a resource element 4 (referred to as an RE 4 in the following) shown in FIG. 2 each are used to transmit a reference signal.

The resource number may be a target CSI-RS port number. For example, in LTE and LTE-Advance, one CSI-RS port may occupy two REs (or four REs). In this case, the resource number may be a combination of two (or four) REs and an orthogonal code whose length is 2 (or 4). A case for a target CSI-RS port is similar to this. For example, based on the example described in FIG. 2, if the base station has four target CSI-RS ports, a target CSI-RS port whose number is 1 may be corresponding to the RE 1 and the RE 2, and use an orthogonal code whose number is a1 in a predefined group of orthogonal codes; a target CSI-RS port whose number is 2 may be corresponding to the RE 1 and the RE 2, and use an orthogonal code whose number is a2 in the predefined group of orthogonal codes; a target CSI-RS port whose number is 3 may be corresponding to the RE 3 and the RE 4, and use the orthogonal code whose number is a1 in the predefined group of orthogonal codes; and a target CSI-RS port whose number is 4 may be corresponding to the RE 3 and the RE 4, and use the orthogonal code whose number is a2 in the predefined group of orthogonal codes.

The resource number may be a row (or column) number of an orthogonal matrix. When the resource number is a row (or column) number of an orthogonal matrix, any two rows (or columns) of elements of the orthogonal matrix are orthogonal. In this case, a plurality of rows (or columns) of elements of the orthogonal matrix may be corresponding to a same time-frequency resource, or time-frequency resources corresponding to a row (or column) of elements of the orthogonal matrix may be preset. As shown in FIG. 2, if a first column of the orthogonal matrix includes four elements, time-frequency resources corresponding to the first column of the orthogonal matrix may be the RE 1, the RE 2, the RE 3, and the RE 4. A second column of the orthogonal matrix includes four elements, and time-frequency resources corresponding to the second column of the orthogonal matrix are also the RE 1, the RE 2, the RE 3, and the RE 4.

In addition, the resource number may be a resource element number, a code number of an orthogonal code in a predefined group of orthogonal codes, or a row number or a column number of a predefined orthogonal matrix, or may be a combination of a resource element and a code number of an orthogonal code in a predefined group of orthogonal codes and/or a row (or column) number of a predefined orthogonal matrix.

The resource number may be a resource element number. For example, the resource number may be a resource element number of one or more resource elements in the resource element 1, the resource element 2, the resource element 3, and the resource element 4. Resource element numbers are used to distinguish between different resource elements.

The resource number may be a code number of an orthogonal code in a predefined group of orthogonal codes. In this case, a plurality of orthogonal codes in the group of orthogonal codes may be corresponding to a same time-frequency resource, or a time-frequency resource corresponding to an orthogonal code with a specified code number may be preset. Based on the example described in FIG. 2, if an orthogonal code with a code number A includes four elements, time-frequency resources corresponding to the orthogonal code with the code number A may be the RE 1, the RE 2, the RE 3, and the RE 4. An orthogonal code with a code number B includes four elements, and time-frequency resources corresponding to the orthogonal code with the code number B may also be the RE 1, the RE 2, the RE 3, and the RE 4.

It should be noted that the time-frequency resource corresponding to the resource number is a time-frequency resource that can be indicated by the resource number. The resource number of the terminal may be obtained through allocation by the base station based a resource pool, and the resource pool is configured in both the terminal and the base station.

Optionally, the resource numbers are resource numbers of R resources included in a resource pool, one resource is corresponding to one resource number, and R is an integer greater than or equal to 2. The resource pool is a resource pool defined by the base station. The base station may send the resource pool to the terminal by using Radio Resource Control (Radio Resource Control, RRC for short) signaling. Correspondingly, the terminal may receive the resource pool by using the RRC signaling.

Specifically, after defining the resource pool, the base station may indicate the resource pool to the terminal by using static/semi-static signaling (for example, the RRC signaling). The base station does not send data on a time-frequency resource corresponding to the resource number in the resource pool. After receiving the resource pool, the terminal considers that all resource numbers in the resource pool are allocated to one or more terminals, so that the terminal determines interference.

Optionally, in specific implementation, step 101 may include: determining, by the base station based on the resource number, the CSI-RS corresponding to the resource number, and the precoding matrix, the target CSI-RS sent on each of the time-frequency resources corresponding to the resource numbers.

Figure 3:
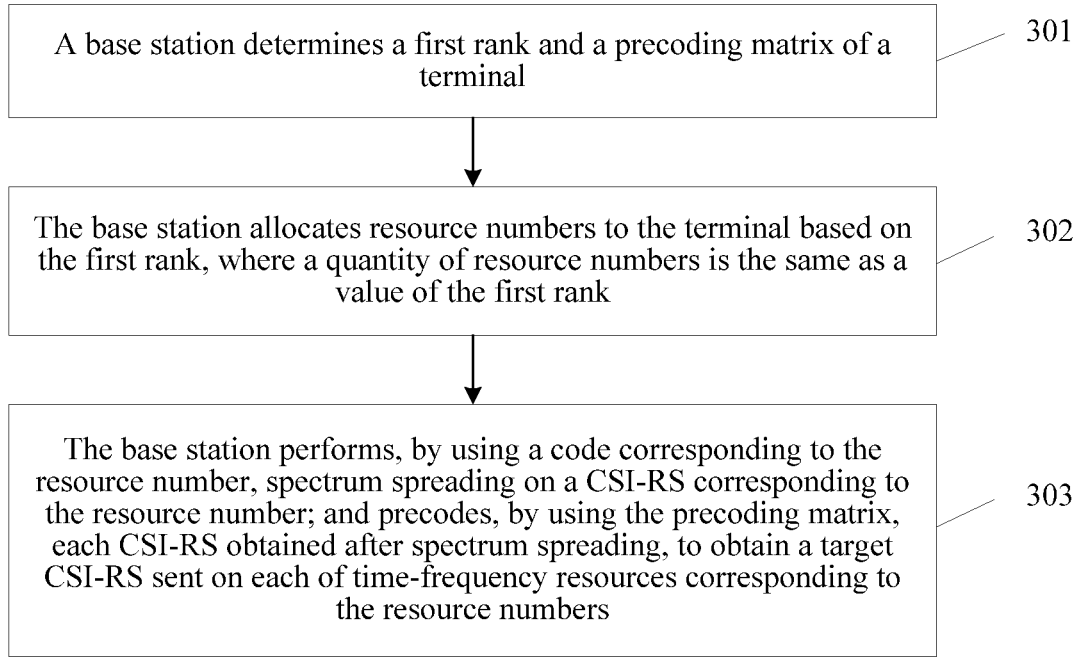
FIG. 3 is a flowchart of a target CSI-RS determining method according to an embodiment of the present invention.

Optionally, as shown in FIG. 3, a process of determining, by the base station based on the resource number, the CSI-RS corresponding to the resource number, and the precoding matrix, the target CSI-RS sent on each of the time-frequency resources corresponding to the resource numbers may be specifically implemented by using the following steps 301 to 303:

301. The base station determines a first rank and a precoding matrix of the terminal.

When the terminal is one of a plurality of terminals that form MU-MIMO, a first rank and a precoding matrix that are determined by the base station and that are corresponding to each of the plurality of terminals that form MU-MIMO can make interference between the plurality of terminals relatively small.

302. The base station allocates the resource numbers to the terminal based on the first rank, where a quantity of resource numbers is the same as a value of the first rank.

303. The base station performs, by using a code corresponding to the resource number, spectrum spreading on a CSI-RS corresponding to the resource number; and precodes, by using the precoding matrix, each CSI-RS obtained after spectrum spreading, to obtain the target CSI-RS sent on each of the time-frequency resources corresponding to the resource numbers.

When the resource number is a target CSI-RS port number, the code corresponding to the resource number is a code whose length is N and that is corresponding to the target CSI-RS port; or when the resource number is a row number of an orthogonal matrix, the code corresponding to the resource number is a row element corresponding to the row number; or when the resource number is a column number of an orthogonal matrix, the code corresponding to the resource number is a column element corresponding to the column number.

Specifically, CSI-RSs transmitted by the base station on different PRBs may be different symbols or same symbols in a CSI-RS sequence.

In Example 1, the first rank corresponding to the terminal is 1. In this case, if a target CSI-RS port number allocated by the base station to the terminal is 1, based on the example described in FIG. 2, the target CSI-RS port 1 is corresponding to two resource elements, the two resource elements are the RE 1 and the RE 2, and the target CSI-RS port 1 is also corresponding to a code whose length is 2. After spectrum spreading is performed, by using the code whose length is 2, on the CSI-RS corresponding to the resource number, a CSI-RS on the RE 1 is a CSI-RS 1, and a CSI-RS on the RE 2 is a CSI-RS 2. If the base station has two antenna ports in total, and the precoding matrix corresponding to the terminal is $$\begin{bmatrix} H_1 \\ H_2 \end{bmatrix},$$

the precoding matrix may be multiplied by the reference signal CSI-RS 1 on the RE 1 (a multiplication result is a target CSI-RS on the RE 1), and the base station transmits the multiplication result on the RE 1 by using an antenna port 1 and an antenna port 2; and the precoding matrix may be multiplied by the reference signal CSI-RS 2 on the RE 2 (a multiplication result is a target CSI-RS on the RE 2), and the base station transmits the multiplication result on the RE 2 by using the antenna port 1 and the antenna port 2. Because both the CSI-RS 1 and the CSI-RS 2 are obtained after spectrum spreading is performed based on the CSI-RS, the CSI-RS 1 and the CSI-RS 2 are essentially different forms of the CSI-RS. It can be learned that the target CSI-RS is a result of multiplying the precoding matrix by the CSI-RS corresponding to the resource number, and data sent by the base station on the RE 1 and data sent by the base station on RE 2 are essentially different forms of the target CSI-RS.

To help understand the full specification, Example 1 merely shows an example process of determining, when the resource number is a target CSI-RS port number, the target CSI-RS corresponding to the resource number. When the resource number is a row number or a column number of an orthogonal matrix, the target CSI-RS may be determined by using a related method in the prior art.

102. The base station sends the target CSI-RS on each of the time-frequency resources corresponding to the resource numbers to the terminal on the time-frequency resource.

Specifically, based on Example 1, if the base station has two antenna ports, $H_1 \cdot CSI\text{-}RS1$ is sent on the RE 1 by using the antenna port 1 of the base station, $H_1 \cdot CSI\text{-}RS2$ is sent on the RE 2 by using the antenna port 1 of the base station, $H_2 \cdot CSI\text{-}RS1$ is sent on the RE 1 by using the antenna port 2 of the base station, and $H_2 \cdot CSI\text{-}RS2$ is sent on the RE 2 by using the antenna port 2 of the base station.

103. The base station sends indication information to the terminal, where the indication information is used to indicate the resource numbers to the terminal.

Optionally, in specific implementation, step 103 includes: sending, by the base station, the indication information to the terminal on a physical downlink control channel (PDCCH), where resource numbers indicated by the indication information sent by the base station to the terminal on PDCCHs in different subframes are the same or different.

The terminal may quickly determine information sent by the base station on the PDCCH. Therefore, the base station may send the indication information in each subframe, so that the terminal measures channel quality based on a resource number allocated by the base station to the terminal.

104. The terminal receives information sent by the base station on each time-frequency resource.

105. The terminal receives the indication information sent by the base station.

Optionally, in specific implementation, step 105 includes: receiving, by the terminal on a PDCCH, the indication information sent by the base station, where resource numbers indicated by the indication information that is sent by the base station and that is received by the terminal on PDCCHs in different subframes are the same or different.

106. The terminal determines the resource numbers of the terminal based on the indication information.

107. The terminal determines target information from the information based on the resource number of the terminal, where the target information is received information that is sent by the base station to the terminal on the time-frequency resource corresponding to the resource number of the terminal.

Specifically, based on Example 1, the target information includes information received on the RE 1 and information received on the RE 2. The information received on the RE 1 is obtained by superimposing $H_1 \cdot CSI\text{-}RS1$ and $H_2 \cdot CSI\text{-}RS1$ that are contaminated by a channel, and the information received on the RE 2 is obtained by superimposing $H_1 \cdot CSI\text{-}RS2$ and $H_2 \cdot CSI\text{-}RS2$ that are contaminated by a channel.

Optionally, in specific implementation, step 107 includes: determining, by the terminal, the information received on the time-frequency resource corresponding to the resource number of the terminal; and despreading, by the terminal by using a code corresponding to the resource number of the terminal, the information received on the time-frequency resource corresponding to the resource number of the terminal, to obtain the target information.

For description of the code corresponding to the resource number, refer to the foregoing description.

It should be noted that because the base station performs, in the process of determining the target CSI-RS sent on each of the time-frequency resources corresponding to the resource numbers of the terminal, spectrum spreading on the CSI-RS corresponding to the resource number of the terminal, after the terminal receives the information on the time-frequency resource corresponding to the resource number of the terminal, the terminal needs to despread the information to obtain the target information.

108. The terminal measures channel quality based on the target information, and determines a CQI based on the measured channel quality.

The terminal needs to determine interference in a process of measuring the CQI based on the target information. Specifically, the terminal may subtract the target information from the information sent on each time-frequency resource, and consider remaining information as a sum of interference from a terminal other than the terminal in MU-MIMO and interference from a neighboring cell user.

109. The terminal sends the CQI to the base station.

110. The base station receives the CQI sent by the terminal.

The CQI is used to indicate the channel quality.

According to the method provided in this embodiment of the present invention, the base station dynamically indicates, to the terminal, the resource number allocated to the terminal. After receiving the resource number indicated by the base station, the terminal determines, based on the resource number, the target information from the information received on each time-frequency resource, measures the CQI based on the target information, and feeds back the CQI to the base station, instead of feeding back all measured CQIs to the base station after measuring the CQIs based on the information received on all time-frequency resources. Therefore, resource consumption of the terminal is greatly reduced.

Optionally, after step 110, the method further includes the following steps:

(11) The base station determines, based on the CQI, a modulation and coding policy corresponding to the terminal, and sends the modulation and coding policy to the terminal, and the terminal receives the modulation and coding policy sent by the base station.

(12) The terminal determines, based on the modulation and coding policy, a demodulation and decoding policy used to demodulate and decode data sent by the base station.

Specifically, for a method for determining the modulation and coding policy based on the CQI, refer to the prior art.

The modulation and coding policy sent by the base station to the terminal may be sent by using control signaling, and the data sent by the base station is data modulated and coded by using the modulation and coding policy.

Optionally, the sending, by the base station, the indication information to the terminal on a PDCCH includes: sending, by the base station, uplink scheduling indication information to the terminal, where the uplink scheduling indication information includes the indication information; or sending, by the base station, downlink scheduling indication information to the terminal, where the downlink scheduling indication information includes the indication information.

Correspondingly, the receiving, by the terminal on a PDCCH, the indication information sent by the base station includes: receiving, by the terminal, uplink scheduling indication information sent by the base station, where the uplink scheduling indication information includes the indication information; or receiving, by the terminal, downlink scheduling indication information sent by the base station, where the downlink scheduling indication information includes the indication information.

Optionally, when the downlink scheduling indication information includes the indication information, the method further includes the following steps.

(21) The base station sends the indication information, the target CSI-RS, and a downlink data resource allocation manner to the terminal in an $M^{th}$ subframe, so that the terminal measures channel quality of data sent by the base station in an $(M+K)^{th}$ subframe, where both M and K are integers greater than or equal to 1.

(22) The base station sends, to the terminal, a modulation and coding policy corresponding to the terminal in the $(M+K)^{th}$ subframe, where a quantity and locations of physical resource blocks PRBs allocated by the base station in the $M^{th}$ subframe to the target CSI-RS are the same as a quantity and locations of PRBs occupied by a data channel sent by the base station in the $(M+K)^{th}$ subframe.

(23) The terminal measures, based on the received $M^{th}$ subframe sent by the base station, the channel quality of the data sent by the base station in the $(M+K)^{th}$ subframe.

In this optional method, bandwidth of the target CSI-RS is consistent with bandwidth of the data, and the terminal may measure the target CSI-RS and feed back the CQI within corresponding bandwidth, thereby reducing resource consumption for uplink feedback.

In the prior art, the data resource allocation manner and the modulation and coding policy are delivered together on a control channel by using the downlink scheduling indication information. In this embodiment of the present invention, when the base station adds the indication information to the downlink scheduling indication information, the base station may determine, based on a resource number allocated to a terminal, a time-frequency resource location at which a reference signal is sent to the terminal, and needs to determine a modulation and coding policy based on a CQI. Therefore, the data resource allocation manner and the indication information may be sent to the terminal on a PDCCH in one subframe, and after the modulation and coding policy of the terminal is determined, the modulation and coding policy is sent to the terminal on a PDCCH in another subframe.

Optionally, the method further includes: sending, by the base station, trigger information to the terminal, where the trigger information is used to trigger the terminal to measure the channel quality and/or a second rank based on the information received on each of the time-frequency resources corresponding to the resource numbers indicated by the indication information; receiving, by the terminal, the trigger information sent by the base station; and determining, by the terminal based on the trigger information, to measure the channel quality and/or the second rank. For description of the second rank, refer to the following description.

It should be noted that the indication information (or the trigger information) may be included in the uplink scheduling indication information, or the trigger information (or the indication information) is included in the downlink scheduling indication information. Certainly, the indication information and the trigger information may be included in a same message.

Optionally, the resource numbers are the resource numbers of the R resources included in the resource pool, the indication information includes R bits, an $r^{th}$ bit in the R bits is used to indicate whether to allocate an $r^{th}$ resource in the R resources to the terminal, R is an integer greater than or equal to 2, and r is an integer greater than or equal to 1 and less than or equal to R; or the indication information includes 3 bits, and the resource numbers indicated by the indication information are different when values of the 3 bits are different; or the indication information includes 4 bits, and the resource numbers indicated by the indication information are different when values of the 4 bits are different.

Optionally, the resource numbers are the resource numbers of the R resources included in the resource pool, and in specific implementation, step 106 includes: determining, by the terminal, the resource numbers of the terminal based on R bits included in the indication information, where an $r^{th}$ bit in the R bits is used to indicate whether to allocate an $r^{th}$ resource in the R resources to the terminal, R is an integer greater than or equal to 2, and r is an integer greater than or equal to 1 and less than or equal to R; or determining, by the terminal, the resource numbers of the terminal based on values of 3 bits included in the indication information; or determining, by the terminal, the resource numbers of the terminal based on values of 4 bits included in the indication information.

For example, if the base station has four target CSI-RS ports, the four target CSI-RS ports may be indicated by using values of 4 bits. A bit i (i is an integer greater than or equal to 0 and less than or equal to 3) indicates an $i^{th}$ target CSI-RS port. 0001 represents a target CSI-RS port 0, 0010 represents a target CSI-RS port 1, and 1010 represents a target CSI-RS port 3 and the target CSI-RS port 1. If the terminal determines that the 4 bits included in the indication information are 0101, the terminal determines that the resource numbers of the terminal are the target CSI-RS port 0 and a target CSI-RS port 2.

It should be noted that in this example, when a value of a bit is 1, it indicates that the base station allocates a resource corresponding to the bit to the terminal. In actual implementation, when a value of a bit is 0, it may also indicate that the base station allocates a resource corresponding to the bit to the terminal. In addition, one of the R bits may be used to indicate whether to allocate one of the R resources to the terminal. Specifically, the base station (or the base station and the terminal) may determine that which bit is used to indicate which resource.

For example, if the base station has four target CSI-RS ports, the four target CSI-RS ports may be indicated by using values of 3 bits. Different values of the 3 bits are corresponding to different target CSI-RS port numbers. For a specific correspondence, refer to Table 1. 0, 1, 2, and 3 in a resource number column in Table 1 are port numbers of the four target CSI-RS ports. One port number is corresponding to one target CSI-RS port.

TABLE 1

| Value of 3 bits | Resource number |
|---|---|
| 0 | 0 |
| 1 | 1 |
| 2 | 2 |
| 3 | 3 |
| 4 | 0 and 1 |
| 5 | 2 and 3 |
| 6 | 0, 1, and 2 |
| 7 | 0, 1, 2, and 3 |

For example, if the base station has eight target CSI-RS ports, the eight target CSI-RS ports may be indicated by using values of 4 bits. Different values of the 4 bits are corresponding to different target CSI-RS port numbers. For a specific correspondence, refer to Table 2. Digits 0 to 7 in a resource number column in Table 2 are port numbers of the eight target CSI-RS ports. One port number is corresponding to one target CSI-RS port.

TABLE 2

| Value of 4 bits | Resource number |
|---|---|
| 0 | 0 |
| 1 | 1 |
| 2 | 2 |
| 3 | 3 |
| 4 | 0 and 1 |
| 5 | 2 and 3 |
| 6 | 4 and 5 |
| 7 | 6 and 7 |
| 8 | 0, 1, and 2 |
| 9 | 3, 4, and 5 |
| 10 | 0, 1, 2, and 3 |
| 11 | 4, 5, 6, and 7 |
| 12 | 0, 1, 2, 3, and 4 |
| 13 | 0, 1, 2, 3, 4, and 5 |
| 14 | 0, 1, 2, 3, 4, 5, and 6 |
| 15 | 0, 1, 2, 3, 4, 5, 6, and 7 |

Optionally, the method further includes the following steps.

(31) The terminal determines that the quantity of resource numbers is the value of the first rank, where the first rank is an initial rank determined by the base station for the terminal.

(32) The terminal measures a second rank based on the target information and the first rank, and determines an RI based on the measured second rank, where the second rank corresponding to the RI is less than or equal to the first rank.

(33) The terminal sends the RI to the base station.

(34) The base station receives the RI sent by the terminal.

(35) The base station determines the second rank based on the RI.

(36) The base station precodes, by using the precoding matrix corresponding to the terminal, a data stream sent to the terminal, and sends the data stream on a data port, where a quantity of data ports is the same as the value of the first rank, a layer quantity of the data stream is the same as a value of the second rank, and the second rank is less than or equal to the first rank.

The data port is a port obtained after an antenna port is weighted by using the precoding matrix. The data port is used to send data. For a same terminal, a precoding matrix used for a target CSI-RS port of the terminal and a precoding matrix used to weight the antenna port are a same precoding matrix.

In the foregoing method, when the terminal is one of a plurality of terminals that form MU-MIMO, after the base station determines to form MU-MIMO by using the plurality of terminals, the base station redetermines a precoding matrix for each terminal, and consequently, CQIs reported by the terminals before the terminals form MU-MIMO are inaccurate. Therefore, each terminal needs to feed back a CQI again. However, because of a high correlation between a rank and a CQI, if the base station still sends data to the terminal based on the first rank after the CQI changes, the terminal may not correctly decode the data. Therefore, in this embodiment of the present invention, the terminal further determines the second rank based on the target information, and feeds back the RI to the base station. The base station finally determines the second rank as a rank corresponding to the terminal, thereby ensuring that the terminal can correctly decode the data. However, when sending the data stream to the terminal, the base station still sends data by using data ports whose quantity is the same as the value of the first rank, and the precoding matrix used for the data port is the same as the precoding matrix used for the target CSI-RS port. In this way, stability of interference between the plurality of terminals can be ensured.

Specifically, the terminal may determine a first RI based on a quantity of resource numbers indicated by the indication information, and the quantity of resource numbers is a value of the first RI.

In this case, when the terminal measures the second rank based on the target information, and when the value of the first rank is 1 (in other words, the quantity of resource numbers indicated by the indication information is 1), because a minimum value of a rank corresponding to the terminal is 1, after the terminal receives the indication information, the terminal may determine only the CQI based on the target information, and does not redetermine the second rank. When the value of the first rank is greater than 1 (in other words, the quantity of resource numbers indicated by the indication information is greater than 1), after the terminal receives the indication information, the terminal may sequentially determine CQIs corresponding to different values of the rank (a value of the rank is an integer greater than or equal to 1) whose maximum value is the value of the first rank, finally select, as the second rank, a rank corresponding to a maximum throughput rate, and feed back an RI and a CQI that are corresponding to the second rank to the base station.

In the following plurality of scenarios, a method for determining, by the terminal, the second rank and a CQI that are corresponding to the RI is briefly described.

Scenario 1: The quantity of resource numbers allocated by the base station to the terminal is 2. In this case, the terminal separately calculates CQIs when rank=2 and rank=1, and the terminal compares throughput rates measured when rank=2 and rank=1, and reports, to the base station, a rank (namely, the second rank) corresponding to a maximum throughput rate, and an RI and a CQI that are corresponding to the rank.

$$\begin{bmatrix} y^{(0)}(k) \\ y^{(1)}(k) \end{bmatrix} = \begin{bmatrix} x^{(0)}(i) \\ x^{(1)}(i) \end{bmatrix}$$

The terminal calculates, based on this assumption, a CQI corresponding to each data stream. $x^{(0)}(i)$ represents an $i^{th}$ data symbol in a first data stream, $x^{(1)}(i)$ represents an $i^{th}$ data symbol in a second data stream, $y^{(0)}(k)$ represents a $k^{th}$ data symbol sent on a first data port, $y^{(1)}(k)$ represents a $k^{th}$ data symbol sent on a second data port, and both i and k are integers greater than or equal to 0.

When the terminal calculates the CQI when rank=1, the terminal sends data in a transmit diversity manner defined in the LTE system. To be specific, assuming that the base station allocates one data stream to the terminal, data transmitted on two data ports is respectively:

$$\begin{bmatrix} y^{(0)}(2k) \\ y^{(1)}(2k) \\ y^{(0)}(2k+1) \\ y^{(1)}(2k+1) \end{bmatrix} = \frac{1}{\sqrt{2}} \begin{bmatrix} 1 & 0 & j & 0 \\ 0 & -1 & 0 & j \\ 0 & 1 & 0 & j \\ 1 & 0 & -j & 0 \end{bmatrix} \begin{bmatrix} \mathrm{Re}(x(2i)) \\ \mathrm{Re}(x(2i+1)) \\ \mathrm{Im}(x(2i)) \\ \mathrm{Im}(x(2i+1)) \end{bmatrix}$$

The terminal calculates, based on this assumption, a CQI corresponding to the data stream. x(p) represents a $p^{th}$ data symbol in the data stream, and p is equal to 2i or 2i+1; $y^{(0)}(q)$ represents a $q^{th}$ data symbol sent on a first data port; $y^{(1)}(q)$ represents a $q^{th}$ data symbol sent on a second data port, and q is equal to 2k or 2k+1; and both i and k are integers greater than or equal to 0.

When the terminal calculates the CQI when rank=1, it may be assumed that a data stream is alternately sent on two data ports, namely:

$$\begin{bmatrix} y^{(0)}(2k) \\ y^{(1)}(2k) \\ y^{(0)}(2k+1) \\ y^{(1)}(2k+1) \end{bmatrix} = \begin{bmatrix} 1 & 0 \\ 0 & 0 \\ 0 & 1 \\ 0 & 0 \end{bmatrix} \begin{bmatrix} x(2i) \\ x(2i+1) \end{bmatrix}$$

The terminal calculates, based on this assumption, a CQI corresponding to the data stream. x(p) represents a $p^{th}$ data symbol in the data stream, and p is equal to 2i or 2i+1; $y^{(0)}(q)$ represents a $q^{th}$ data symbol sent on a first data port; $y^{(1)}(q)$ represents a $q^{th}$ data symbol sent on a second data port, and q is equal to 2k or 2k+1; and both i and k are integers greater than or equal to 0.

Scenario 2: The quantity of resource numbers allocated by the base station to the terminal is 3. In this case, the terminal separately calculates CQIs when rank=3, rank=2, and rank=1, and the terminal compares throughput rates measured when rank=3, rank=2, and rank=1, and reports, to the base station, a rank (namely, the second rank) corresponding to a maximum throughput rate, and an RI and a CQI that are corresponding to the rank.

When the terminal calculates the CQI when rank=3, assuming that the base station allocates two data streams to the terminal, a first data stream is separately transmitted on a first data port and a second data port, and a second data stream is transmitted on a third data port, data sent by the base station on each data port is:

$$\begin{bmatrix} y^{(0)}(k) \\ y^{(1)}(k) \\ y^{(2)}(k) \end{bmatrix} = \begin{bmatrix} x^{(0)}(2i) \\ x^{(0)}(2i+1) \\ x^{(1)}(i) \end{bmatrix}$$

The terminal calculates, based on this assumption, a CQI corresponding to each data stream. $x^{(0)}(2i)$ represents a $(2i)^{th}$ data symbol in the first data stream, $x^{(1)}(i)$ represents an $i^{th}$ data symbol in the second data stream, $x^{(0)}(2i+1)$ represents a $(2i+1)^{th}$ data symbol in the first data stream, $y^{(p)}(k)$ represents a $k^{th}$ data symbol sent on a $(p+1)^{th}$ data port, p is 0, 1, or 2, and both i and k are integers greater than or equal to 0.

When the terminal calculates the CQI when rank=2, assuming that the base station allocates two data streams to the terminal, a first data stream is transmitted on a first data port, and a second data stream and a third data stream are alternately transmitted on a second data port and a third data port, a $(2k)^{th}$ (k is an integer greater than or equal to 1) data symbol sent by the base station on each of the three data ports is:

$$\begin{bmatrix} y^{(0)}(2k) \\ y^{(1)}(2k) \\ y^{(2)}(2k) \end{bmatrix} = \begin{bmatrix} 1 & 0 \\ 0 & 1 \\ 0 & 0 \end{bmatrix} \begin{bmatrix} x^{(0)}(2i) \\ x^{(1)}(2i) \end{bmatrix}$$

A $(2k+1)^{th}$ data symbol sent by the base station on each of the three data ports is:

$$\begin{bmatrix} y^{(0)}(2k+1) \\ y^{(1)}(2k+1) \\ y^{(2)}(2k+1) \end{bmatrix} = \begin{bmatrix} 1 & 0 \\ 0 & 0 \\ 0 & 1 \end{bmatrix} \begin{bmatrix} x^{(0)}(2i+1) \\ x^{(1)}(2i+1) \end{bmatrix}$$

The terminal calculates, based on this assumption, CQIs corresponding to the two data streams. $x^{(p)}(2i)$ represents a $(2i)^{th}$ data symbol in a $(p+1)^{th}$ data stream, $x^{(p)}(2i+1)$ represents a $(2i+1)^{th}$ data symbol in the $(p+1)^{th}$ data stream, and p is 0 or 1; $y^{(q)}(2k)$ represents a $(2k)^{th}$ data symbol sent on a $(q+1)^{th}$ data port, $y^{(q)}(2k+1)$ represents a $(2k+1)^{th}$ data symbol sent on the $(q+1)^{th}$ data port, q is 0, 1, or 2, and i is an integer greater than or equal to 0.

When the terminal calculates the CQI when rank=1, assuming that the base station allocates one data stream to the terminal, and the data stream is alternately sent on three data ports, data sent by the base station on each data port is:

$y^{(0)}(3k)=x(3i), y^{(1)}(3k)=0, y^{(2)}(3k)=0$ $y^{(0)}(3k+1)=0, y^{(1)}(3k+1)=x(3i+1), y^{(2)}(3k+1)=0$ $y^{(0)}(3k+2)=0, y^{(1)}(3k+2)=0, y^{(2)}(3k+1)=x(3i+2)$

The terminal calculates, based on this assumption, a CQI corresponding to the data stream. x(p) represents a $p^{th}$ data symbol in the data stream, and p is 3i, 3i+1, or 3i+2; $y^{(0)}(q)$ represents a $q^{th}$ data symbol sent on a first data port, $y^{(1)}(q)$ represents a $q^{th}$ data symbol sent on a second data port, $y^{(2)}(q)$ represents a $q^{th}$ data symbol sent on a third data port, q is 3k, 3k+1, or 3k+2, and both i and k are integers greater than or equal to 0.

Scenario 3: The quantity of resource numbers allocated by the base station to the terminal is 4. In this case, the terminal separately calculates CQIs when rank=4, rank=3, rank=2, and rank=1, and the terminal compares throughput rates measured when rank=4, rank=3, rank=2, and rank=1, and reports, to the base station, a rank (namely, the second rank) corresponding to a maximum throughput rate, and an RI and a CQI that are corresponding to the rank.

When the terminal calculates the CQI when rank=4, assuming that the base station allocates two data streams to the terminal, a first data stream is separately transmitted on a first data port and a second data port, and a second data stream is transmitted on a third data port and a fourth data port, data sent by the base station on each data port is:

$$\begin{bmatrix} y^{(0)}(k) \\ y^{(1)}(k) \\ y^{(2)}(k) \\ y^{(3)}(k) \end{bmatrix} = \begin{bmatrix} x^{(0)}(2i) \\ x^{(0)}(2i+1) \\ x^{(1)}(2i) \\ x^{(1)}(2i+1) \end{bmatrix}$$

The terminal calculates, based on this assumption, CQIs corresponding to the two data streams. $x^{(0)}(p)$ represents a $p^{th}$ data symbol in the first data stream, $x^{(1)}(p)$ represents a $p^{th}$ data symbol in the second data stream, and p is 2i or 2i+1; $y^{(q)}(k)$ represents a $k^{th}$ data symbol sent on a $(q+1)^{th}$ data port, q is 0, 1, 2, or 3, and both i and k are integers greater than or equal to 0.

When the terminal calculates the CQI when rank=3, assuming that the base station allocates two data streams to the terminal, a first data stream is separately transmitted on a first data port and a second data port, data sent by the base station on the first data port and the second data port is:

$$\begin{bmatrix} y^{(0)}(2k) \\ y^{(1)}(2k) \end{bmatrix} = \begin{bmatrix} 1 & 0 \\ 0 & 1 \end{bmatrix} \begin{bmatrix} x^{(0)}(2i) \\ x^{(0)}(2i+1) \end{bmatrix}$$

The second data stream is transmitted on a third data port and a fourth data port, and data sent by the base station on the third data port and the fourth data port is:

$$\begin{bmatrix} y^{(2)}(2k) \\ y^{(3)}(2k) \\ y^{(2)}(2k+1) \\ y^{(3)}(2k+1) \end{bmatrix} = \begin{bmatrix} 1 & 0 \\ 0 & 0 \\ 0 & 0 \\ 0 & 1 \end{bmatrix} \begin{bmatrix} x^{(1)}(2i) \\ x^{(1)}(2i+1) \end{bmatrix}$$

The terminal calculates, based on this assumption, CQIs corresponding to the two data streams. $x^{(0)}(p)$ represents a $p^{th}$ data symbol in the first data stream, $x^{(1)}(p)$ represents a $p^{th}$ data symbol in the second data stream, and p is 2i or 2i+1; $y^{(q)}(2k)$ represents a $(2k)^{th}$ data symbol sent on a $(q+1)^{th}$ data port, $y^{(2)}(2k+1)$ represents a $(2k+1)^{th}$ data symbol sent on the third data port, $y^{(3)}(2k+1)$ represents a $(2k+1)^{th}$ data symbol sent on the fourth data port, q is 0, 1, 2, or 3, and both i and k are integers greater than or equal to 0.

When the terminal calculates the CQI when rank=2, assuming that the base station allocates two data streams to the terminal, a first data stream is separately and alternately transmitted on a first data port and a second data port, data sent by the base station on the first data port and the second data port is:

$$\begin{bmatrix} y^{(0)}(2k) \\ y^{(1)}(2k) \\ y^{(0)}(2k+1) \\ y^{(1)}(2k+1) \end{bmatrix} = \begin{bmatrix} 1 & 0 \\ 0 & 0 \\ 0 & 0 \\ 0 & 1 \end{bmatrix} \begin{bmatrix} x^{(0)}(2i) \\ x^{(0)}(2i+1) \end{bmatrix}$$

The second data stream is separately and alternately transmitted on a third data port and a fourth data port, and data sent by the base station on the third data port and the fourth data port is:

$$\begin{bmatrix} y^{(2)}(2k) \\ y^{(3)}(2k) \\ y^{(2)}(2k+1) \\ y^{(3)}(2k+1) \end{bmatrix} = \begin{bmatrix} 1 & 0 \\ 0 & 0 \\ 0 & 0 \\ 0 & 1 \end{bmatrix} \begin{bmatrix} x^{(1)}(2i) \\ x^{(1)}(2i+1) \end{bmatrix}$$

The terminal calculates, based on this assumption, CQIs corresponding to the two data streams. $x^{(0)}(p)$ represents a $p^{th}$ data symbol in the first data stream, $x^{(1)}(p)$ represents a $p^{th}$ data symbol in the second data stream, and p is 2i or 2i+1; $y^{(q)}(2k)$ represents a $(2k)^{th}$ data symbol sent on a $(q+1)^{th}$ data port, $y^{(q)}(2k+1)$ represents a $(2k+1)^{th}$ data symbol sent on the $(q+1)^{th}$ data port, q is 0, 1, 2, or 3, and both i and k are integers greater than or equal to 0.

When the terminal calculates the CQI when rank=1, assuming that the base station allocates one data stream to the terminal, and transmits the data stream in a transmit diversity manner by using four data ports, data sent by the base station on the four data ports is:

$$\begin{bmatrix} y^{(0)}(4k) \\ y^{(1)}(4k) \\ y^{(2)}(4k) \\ y^{(3)}(4k) \\ y^{(0)}(4k+1) \\ y^{(1)}(4k+1) \\ y^{(2)}(4k+1) \\ y^{(3)}(4k+1) \\ y^{(0)}(4k+2) \\ y^{(1)}(4k+2) \\ y^{(2)}(4k+2) \\ y^{(3)}(4k+2) \\ y^{(0)}(4k+3) \\ y^{(1)}(4k+3) \\ y^{(2)}(4k+3) \\ y^{(3)}(4k+3) \end{bmatrix} = \frac{1}{\sqrt{2}} \begin{bmatrix} 1 & 0 & 0 & 0 & j & 0 & 0 & 0 \\ 0 & 0 & 0 & 0 & 0 & 0 & 0 & 0 \\ 0 & -1 & 0 & 0 & 0 & j & 0 & 0 \\ 0 & 0 & 0 & 0 & 0 & 0 & 0 & 0 \\ 0 & 1 & 0 & 0 & 0 & j & 0 & 0 \\ 0 & 0 & 0 & 0 & 0 & 0 & 0 & 0 \\ 1 & 0 & 0 & 0 & -j & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 1 & 0 & 0 & 0 & j & 0 \\ 0 & 0 & 0 & 0 & 0 & 0 & 0 & 0 \\ 0 & 0 & 0 & -1 & 0 & 0 & 0 & j \\ 0 & 0 & 0 & 0 & 0 & 0 & 0 & 0 \\ 0 & 0 & 0 & 1 & 0 & 0 & 0 & j \\ 0 & 0 & 0 & 0 & 0 & 0 & 0 & 0 \\ 0 & 0 & 1 & 0 & 0 & 0 & -j & 0 \end{bmatrix} \begin{bmatrix} \mathrm{Re}(x(4i)) \\ \mathrm{Re}(x(4i+1)) \\ \mathrm{Re}(x(4i+2)) \\ \mathrm{Re}(x(4i+3)) \\ \mathrm{Im}(x(4i)) \\ \mathrm{Im}(x(4i+1)) \\ \mathrm{Im}(x(4i+2)) \\ \mathrm{Im}(x(4i+3)) \end{bmatrix}$$

The terminal calculates, based on this assumption, a CQI corresponding to the data stream. x(p) represents a $p^{th}$ data symbol in the data stream, and p is 4i, 4i+1, 4i+2, or 4i+3; $y^{(0)}(q)$ represents a $q^{th}$ data symbol sent on a first data port, $y^{(1)}(q)$ represents a $q^{th}$ data symbol sent on a second data port, $y^{(2)}(q)$ represents a $q^{th}$ data symbol sent on a third data port, $y^{(3)}(q)$ represents a $q^{th}$ data symbol sent on a fourth data port, q is 4k, 4k+1, 4k+2, or 4k+3, and both i and k are integers greater than or equal to 0.

When the terminal calculates the CQI when rank=1, it may be assumed that the base station sends the data stream by alternately using four data ports, and data sent by the base station on the four data ports is:

$y^{(0)}(4k)=x(4i)$, $y^{(1)}(4k)=0$, $y^{(2)}(4k)=0$, $y^{(3)}(4k)=0$ $y^{(0)}(4k+1)=0$, $y^{(1)}(4k+1)=x(4i+1)$, $y^{(2)}(4k+1)=0$, $y^{(3)}(4k+1)=0$ $y^{(0)}(4k+2)=0$, $y^{(1)}(4k+2)=0$, $y^{(2)}(4k+2)=x(4i+2)$, $y^{(3)}(4k+2)=0$ $y^{(0)}(4k+3)=0$, $y^{(1)}(4k+3)=0$, $y^{(2)}(4k+3)=0$, and $y^{(3)}(4k+3)=x(4i+3)$ The terminal calculates, based on this assumption, a CQI corresponding to the data stream. x(p) represents a $p^{th}$ data symbol in the data stream, and p is 4i, 4i+1, 4i+2, or 4i+3; $y^{(0)}(q)$ represents a $q^{th}$ data symbol sent on a first data port, $y^{(1)}(q)$ represents a $q^{th}$ data symbol sent on a second data port, $y^{(2)}(q)$ represents a $q^{th}$ data symbol q sent on a third data port, $y^{(3)}(q)$ represents a $q^{th}$ data symbol sent on a fourth data port, q is 4k, 4k+1, 4k+2, or 4k+3, and both i and k are integers greater than or equal to 0.

Figure 4:
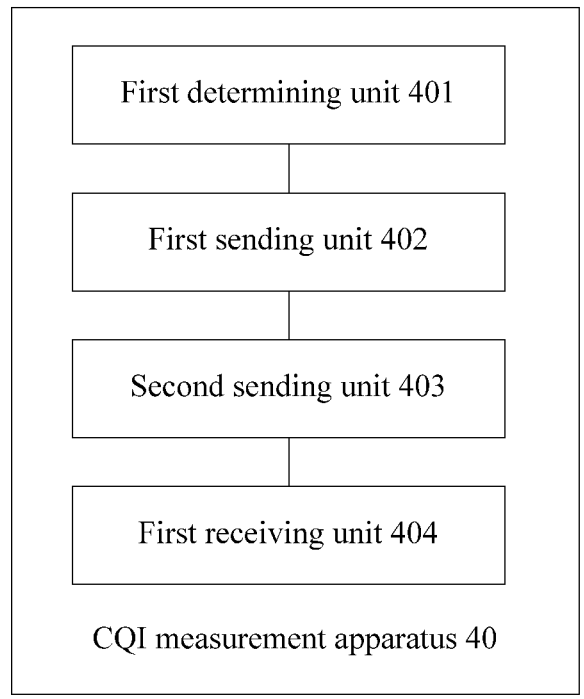
FIG. 4 is a schematic composition diagram of a CQI measurement apparatus according to an embodiment of the present invention.

An embodiment of the present invention further provides a CQI measurement apparatus 40. As shown in FIG. 4, the apparatus 40 includes: a first determining unit 401, configured to determine a target CSI-RS on each of time-frequency resources corresponding to resource numbers of a terminal, where the target CSI-RS is a precoded CSI-RS, and the time-frequency resource is a resource element used to transmit the CSI-RS or the target CSI-RS; a first sending unit 402, configured to send the target CSI-RS on each of the time-frequency resources corresponding to the resource numbers to the terminal on the time-frequency resource; a second sending unit 403, configured to send indication information to the terminal, where the indication information is used to indicate the resource numbers to the terminal; and a first receiving unit 404, configured to receive a CQI sent by the terminal, where the CQI is used to indicate channel quality.

Optionally, the second sending unit 403 is specifically configured to: send the indication information to the terminal on a PDCCH, where resource numbers indicated by the indication information sent by the second sending unit 403 to the terminal on PDCCHs in different subframes are the same or different.

Figure 5:
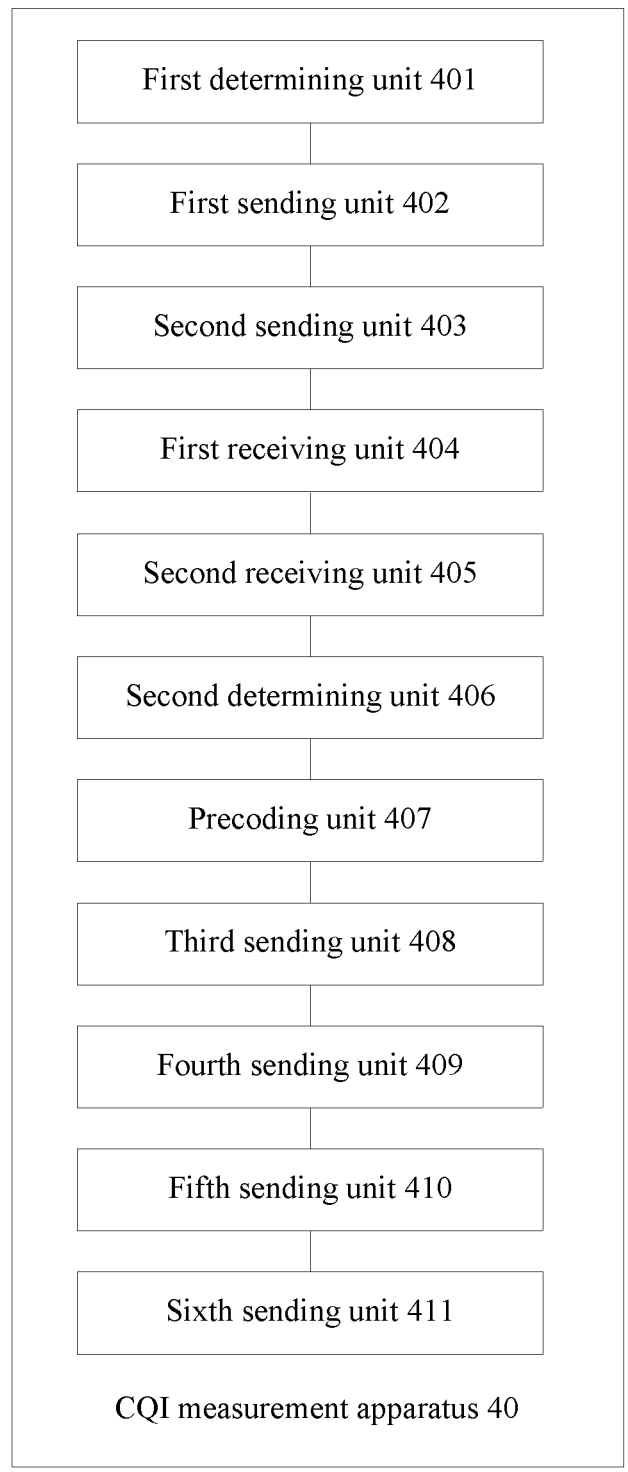
FIG. 5 is a schematic composition diagram of another CQI measurement apparatus according to an embodiment of the present invention.

Optionally, as shown in FIG. 5, the apparatus 40 further includes a second receiving unit 405, a second determining unit 406, a precoding unit 407, and a third sending unit 408.

The second receiving unit 405 is configured to receive an RI sent by the terminal. The RI is an RI determined by the terminal based on a second rank that is measured by the terminal based on information received on each of the time-frequency resources corresponding to the resource numbers indicated by the indication information.

The second determining unit 406 is configured to determine the second rank based on the RI.

The precoding unit 407 is configured to precode, by using a precoding matrix corresponding to the terminal, a data stream sent to the terminal.

The third sending unit 408 is configured to send the data stream on a data port. A quantity of data ports is the same as a value of a first rank, a layer quantity of the data stream is the same as a value of the second rank, the second rank is less than or equal to the first rank, and the first rank is an initial rank determined by a base station for the terminal.

Optionally, as shown in FIG. 5, the apparatus 40 further includes a fourth sending unit 409.

The fourth sending unit 409 is configured to send a resource pool to the terminal by using RRC signaling. The resource numbers are resource numbers of R resources included in the resource pool, one resource is corresponding to one resource number, and R is an integer greater than or equal to 2.

Optionally, the resource number is a target CSI-RS port number, a row number of an orthogonal matrix, or a column number of an orthogonal matrix, a combination of N resource elements and one code whose length is N is corresponding to one target CSI-RS port or one resource element is corresponding to one target CSI-RS port, and N is an integer greater than or equal to 2.

Optionally, the first determining unit 401 is specifically configured to: determine, based on the resource number, a CSI-RS corresponding to the resource number, and the precoding matrix, the target CSI-RS sent on each of the time-frequency resources corresponding to the resource numbers.

Optionally, the first determining unit 401 is specifically configured to: determine the first rank and the precoding matrix of the terminal; allocate the resource numbers to the terminal based on the first rank, where a quantity of resource numbers is the same as the value of the first rank; and perform, by using a code corresponding to the resource number, spectrum spreading on the CSI-RS corresponding to the resource number; and precode, by using the precoding matrix, each CSI-RS obtained after spectrum spreading, to obtain the target CSI-RS sent on each of the time-frequency resources corresponding to the resource numbers.

When the resource number is a target CSI-RS port number, the code corresponding to the resource number is a code whose length is N and that is corresponding to the target CSI-RS port; or when the resource number is a row number of an orthogonal matrix, the code corresponding to the resource number is a row element corresponding to the row number; or when the resource number is a column number of an orthogonal matrix, the code corresponding to the resource number is a column element corresponding to the column number.

Optionally, the resource numbers are the resource numbers of the R resources included in the resource pool, the indication information includes R bits, an $r^{th}$ bit in the R bits is used to indicate whether to allocate an $r^{th}$ resource in the R resources to the terminal, R is an integer greater than or equal to 2, and r is an integer greater than or equal to 1 and less than or equal to R; or the indication information includes 3 bits, and the resource numbers indicated by the indication information are different when values of the 3 bits are different; or the indication information includes 4 bits, and the resource numbers indicated by the indication information are different when values of the 4 bits are different.

Optionally, the apparatus 40 further includes a fifth sending unit 410.

The fifth sending unit 410 is configured to send trigger information to the terminal. The trigger information is used to trigger the terminal to measure the channel quality and/or the second rank based on the information received on each of the time-frequency resources corresponding to the resource numbers indicated by the indication information.

Optionally, the second sending unit 403 is specifically configured to: send uplink scheduling indication information to the terminal, where the uplink scheduling indication information includes the indication information; or send downlink scheduling indication information to the terminal, where the downlink scheduling indication information includes the indication information.

Optionally, as shown in FIG. 5, the apparatus 40 further includes a sixth sending unit 411, configured to: send the indication information, the target CSI-RS, and a downlink data resource allocation manner to the terminal in an $M^{th}$ subframe, so that the terminal measures channel quality of data sent by the base station in an $(M+K)^{th}$ subframe, where both M and K are integers greater than or equal to 1; and send, to the terminal, a modulation and coding policy corresponding to the terminal in the $(M+K)^{th}$ subframe, where a quantity and locations of PRBs allocated by the base station in the $M^{th}$ subframe to the target CSI-RS are the same as a quantity and locations of PRBs occupied by a data channel sent by the base station in the $(M+K)^{th}$ subframe.

The apparatus provided in this embodiment of the present invention may dynamically indicate, to the terminal, the resource number allocated to the terminal. After receiving the resource number indicated by the base station, the terminal determines, based on the resource number, the target information from the information received on each time-frequency resource, measures the CQI based on the target information, and feeds back the CQI to the base station, instead of feeding back all measured CQIs to the base station after measuring the CQIs based on the information received on all time-frequency resources. Therefore, resource consumption of the terminal is greatly reduced.

In hardware implementation, each unit of the CQI measurement apparatus 40 may be built in or independent of a processor of the CQI measurement apparatus 40 in a form of hardware, or may be stored in a memory of the CQI measurement apparatus 40 in a form of software, so that the processor invokes and performs operations corresponding to the foregoing units. The processor may be a central processing unit (Central Processing Unit, CPU for short), an application-specific integrated circuit (Application Specific Integrated Circuit, ASIC for short), or one or more integrated circuits configured to implement this embodiment of the present invention.

Figure 6:
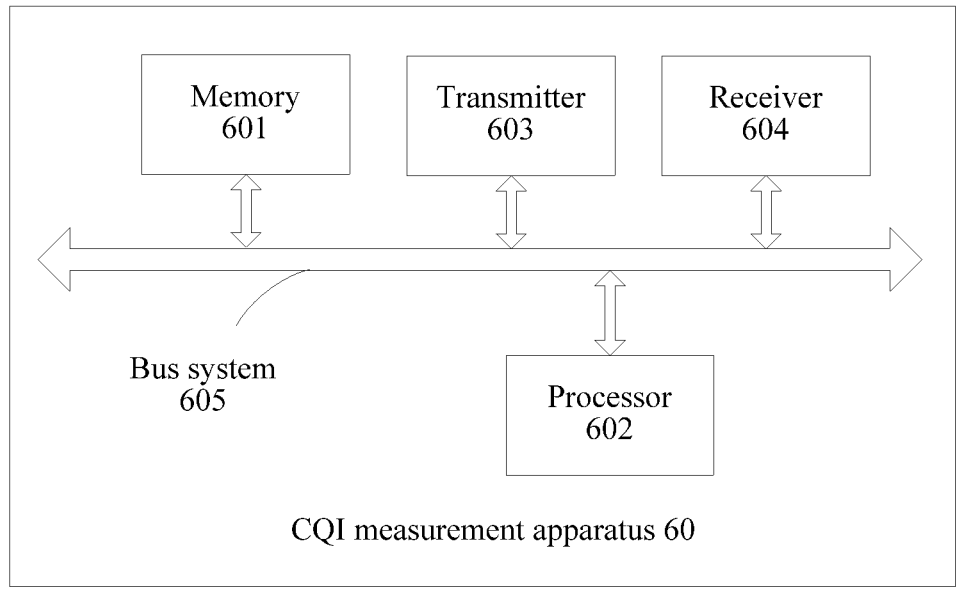
FIG. 6 is a schematic composition diagram of another CQI measurement apparatus according to an embodiment of the present invention.

An embodiment of the present invention further provides a CQI measurement apparatus 60. As shown in FIG. 6, the apparatus 600 includes a memory 601, a processor 602, a transmitter 603, and a receiver 604.

The memory 601, the processor 602, the transmitter 603, and the receiver 604 are coupled together by using a bus system 605. The memory 601 may include a random access memory, and may further include a nonvolatile memory, for example, at least one magnetic disk memory. The bus system 605 may be an industry standard architecture (ISA) bus, a peripheral component interconnect (PCI) bus, an extended industry standard architecture (EISA) bus, or the like. The bus system 605 may be classified into an address bus, a data bus, a control bus, and the like. For ease of representation, only one thick line is used in FIG. 6 for representation, but it does not indicate that there is only one bus or one type of bus.

The memory 601 is configured to store code, and the processor 602 performs the following actions based on the code: determining a target CSI-RS on each of time-frequency resources corresponding to resource numbers of a terminal, where the target CSI-RS is a precoded CSI-RS, and the time-frequency resource is a resource element used to transmit the CSI-RS or the target CSI-RS.

The transmitter 603 is configured to send the target CSI-RS on each of the time-frequency resources corresponding to the resource numbers to the terminal on the time-frequency resource.

The transmitter 603 is further configured to send indication information to the terminal. The indication information is used to indicate the resource numbers to the terminal.

The receiver 604 is configured to receive a CQI sent by the terminal. The CQI is used to indicate channel quality.

Optionally, the transmitter 603 is specifically configured to: send the indication information to the terminal on a PDCCH, where resource numbers indicated by the indication information sent by the transmitter 603 to the terminal on PDCCHs in different subframes are the same or different.

Optionally, the receiver 604 is further configured to receive an RI sent by the terminal. The RI is an RI determined by the terminal based on a second rank that is measured by the terminal based on information received on each of the time-frequency resources corresponding to the resource numbers indicated by the indication information.

The processor 602 is further configured to determine the second rank based on the RI.

The processor 602 is further configured to precode, by using a precoding matrix corresponding to the terminal, a data stream sent to the terminal.

The transmitter 603 is further configured to send the data stream on a data port. A quantity of data ports is the same as a value of a first rank, a layer quantity of the data stream is the same as a value of the second rank, the second rank is less than or equal to the first rank, and the first rank is an initial rank determined by a base station for the terminal.

Optionally, the transmitter 603 is further configured to: send a resource pool to the terminal by using RRC signaling, where the resource numbers are resource numbers of R resources included in the resource pool, one resource is corresponding to one resource number, and R is an integer greater than or equal to 2.

Optionally, the resource number is a target CSI-RS port number, a row number of an orthogonal matrix, or a column number of an orthogonal matrix, a combination of N resource elements and one code whose length is N is corresponding to one target CSI-RS port or one resource element is corresponding to one target CSI-RS port, and N is an integer greater than or equal to 2.

Optionally, the processor 602 is specifically configured to: determine, based on the resource number, a CSI-RS corresponding to the resource number, and the precoding matrix, the target CSI-RS sent on each of the time-frequency resources corresponding to the resource numbers.

Optionally, the processor 602 is specifically configured to: determine the first rank and the precoding matrix of the terminal; allocate the resource numbers to the terminal based on the first rank, where a quantity of resource numbers is the same as the value of the first rank; and perform, by using a code corresponding to the resource number, spectrum spreading on the CSI-RS corresponding to the resource number; and precode, by using the precoding matrix, each CSI-RS obtained after spectrum spreading, to obtain the target CSI-RS sent on each of the time-frequency resources corresponding to the resource numbers.

When the resource number is a target CSI-RS port number, the code corresponding to the resource number is a code whose length is N and that is corresponding to the target CSI-RS port; or when the resource number is a row number of an orthogonal matrix, the code corresponding to the resource number is a row element corresponding to the row number; or when the resource number is a column number of an orthogonal matrix, the code corresponding to the resource number is a column element corresponding to the column number.

Optionally, the resource numbers are the resource numbers of the R resources included in the resource pool, the indication information includes R bits, an $r^{th}$ bit in the R bits is used to indicate whether to allocate an $r^{th}$ resource in the R resources to the terminal, R is an integer greater than or equal to 2, and r is an integer greater than or equal to 1 and less than or equal to R; or the indication information includes 3 bits, and the resource numbers indicated by the indication information are different when values of the 3 bits are different; or the indication information includes 4 bits, and the resource numbers indicated by the indication information are different when values of the 4 bits are different.

Optionally, the transmitter 603 is further configured to: send trigger information to the terminal, where the trigger information is used to trigger the terminal to measure the channel quality and/or the second rank based on the information received on each of the time-frequency resources corresponding to the resource numbers indicated by the indication information.

Optionally, the transmitter 603 is specifically configured to: send uplink scheduling indication information to the terminal, where the uplink scheduling indication information includes the indication information; or send downlink scheduling indication information to the terminal, where the downlink scheduling indication information includes the indication information.

Optionally, the transmitter 603 is further configured to: send the indication information, the target CSI-RS, and a downlink data resource allocation manner to the terminal in an $M^{th}$ subframe, so that the terminal measures channel quality of data sent by the base station in an $(M+K)^{th}$ subframe, where both M and K are integers greater than or equal to 1; and send, to the terminal, a modulation and coding policy corresponding to the terminal in the $(M+K)^{th}$ subframe, where a quantity and locations of PRBs allocated by the base station in the $M^{th}$ subframe to the target CSI-RS are the same as a quantity and locations of PRBs occupied by a data channel sent by the base station in the $(M+K)^{th}$ subframe.

The apparatus provided in this embodiment of the present invention may dynamically indicate, to the terminal, the resource number allocated to the terminal. After receiving the resource number indicated by the base station, the terminal determines, based on the resource number, the target information from the information received on each time-frequency resource, measures the CQI based on the target information, and feeds back the CQI to the base station, instead of feeding back all measured CQIs to the base station after measuring the CQIs based on the information received on all time-frequency resources. Therefore, resource consumption of the terminal is greatly reduced.

Figure 7:
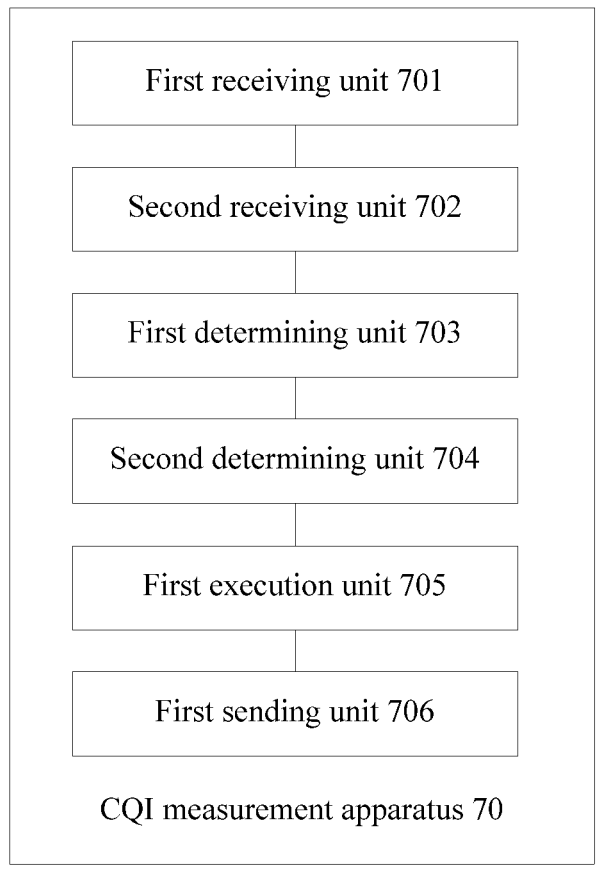
FIG. 7 is a schematic composition diagram of another CQI measurement apparatus according to an embodiment of the present invention.

An embodiment of the present invention further provides a CQI measurement apparatus 70. As shown in FIG. 7, the apparatus 70 includes: a first receiving unit 701, configured to receive information sent by a base station on each time-frequency resource; a second receiving unit 702, configured to receive indication information sent by the base station, where the indication information is used to indicate resource numbers of a terminal to the terminal; a first determining unit 703, configured to determine the resource numbers of the terminal based on the indication information; a second determining unit 704, configured to determine target information from the information based on the resource number of the terminal, where the target information is received information that is sent by the base station to the terminal on a time-frequency resource corresponding to the resource number of the terminal, the time-frequency resource is a resource element used to transmit a CSI-RS or a target CSI-RS, and the target CSI-RS is a precoded CSI-RS; a first execution unit 705, configured to: measure channel quality based on the target information, and determine a CQI based on the measured channel quality; and a first sending unit 706, configured to send the CQI to the base station.

Optionally, the second receiving unit 702 is specifically configured to: receive, on a PDCCH, the indication information sent by the base station, where resource numbers indicated by the indication information that is sent by the base station and that is received by the second receiving unit 702 on PDCCHs in different subframes are the same or different.

Figure 8:
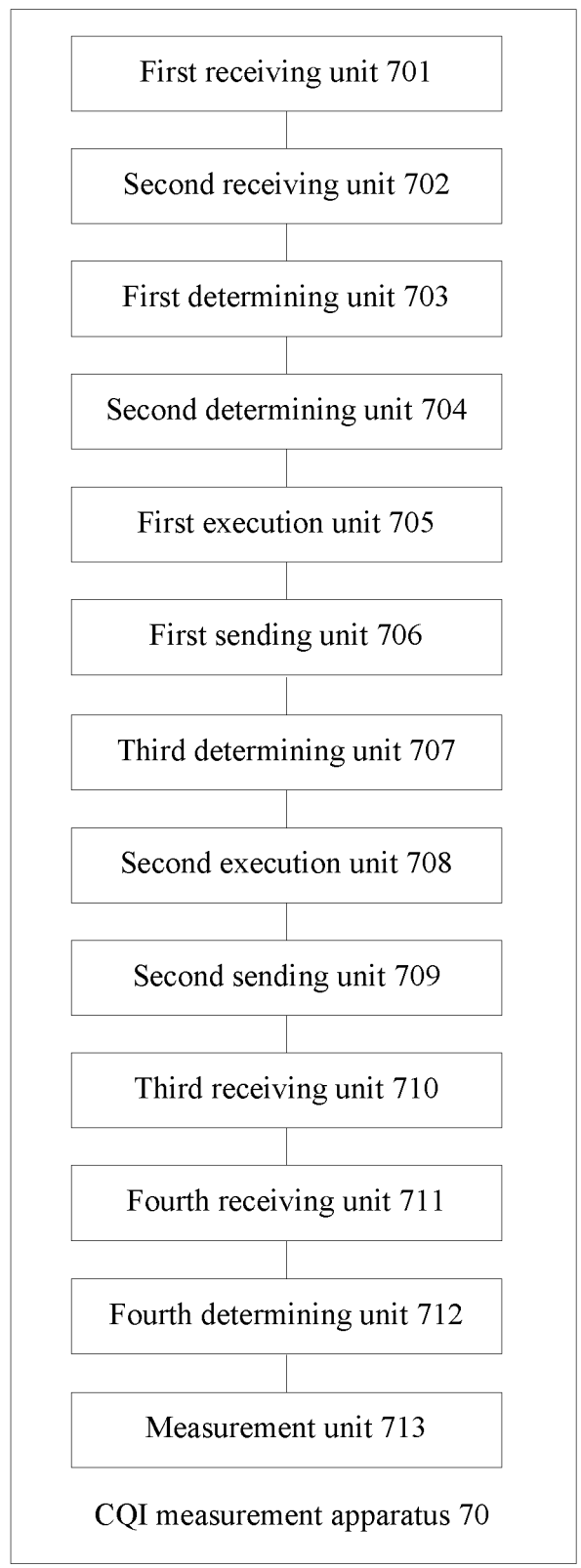
FIG. 8 is a schematic composition diagram of another CQI measurement apparatus according to an embodiment of the present invention.

Optionally, as shown in FIG. 8, the apparatus 70 further includes a third determining unit 707, a second execution unit 708, and a second sending unit 709.

The third determining unit 707 is configured to determine that a quantity of resource numbers is a value of a first rank. The first rank is an initial rank determined by the base station for the terminal.

The second execution unit 708 is configured to: measure a second rank based on the target information and the first rank, and determine an RI based on the measured second rank. The second rank corresponding to the RI is less than or equal to the first rank.

The second sending unit 709 is configured to send the RI to the base station.

Optionally, as shown in FIG. 8, the apparatus 70 further includes a third receiving unit 710, configured to: receive, by using RRC signaling, a resource pool sent by the base station, where the resource numbers are resource numbers of R resources included in the resource pool, one resource is corresponding to one resource number, and R is an integer greater than or equal to 2.

Optionally, the resource number is a target CSI-RS port number, a row number of an orthogonal matrix, or a column number of an orthogonal matrix, a combination of N resource elements and one code whose length is N is corresponding to one target CSI-RS port or one resource element is corresponding to one target CSI-RS port, and N is an integer greater than or equal to 2.

Optionally, the second determining unit 704 is specifically configured to: determine the information received on the time-frequency resource corresponding to the resource number of the terminal; and despread, by using a code corresponding to the resource number of the terminal, the information received on the time-frequency resource corresponding to the resource number of the terminal, to obtain the target information.

When the resource number is a target CSI-RS port number, the code corresponding to the resource number is a code whose length is N and that is corresponding to the target CSI-RS port; or when the resource number is a row number of an orthogonal matrix, the code corresponding to the resource number is a row element corresponding to the row number; or when the resource number is a column number of an orthogonal matrix, the code corresponding to the resource number is a column element corresponding to the column number.

Optionally, the first determining unit 703 is specifically configured to: determine the resource numbers of the terminal based on R bits included in the indication information, where an $r^{th}$ bit in the R bits is used to indicate whether to allocate an $r^{th}$ resource in the R resources to the terminal, R is an integer greater than or equal to 2, and r is an integer greater than or equal to 1 and less than or equal to R; or determine the resource numbers of the terminal based on values of 3 bits included in the indication information; or determine the resource numbers of the terminal based on values of 4 bits included in the indication information.

Optionally, as shown in FIG. 8, the apparatus 70 further includes a fourth receiving unit 711 and a fourth determining unit 712.

The fourth receiving unit 711 is configured to receive trigger information sent by the base station.

The fourth determining unit 712 is configured to determine, based on the trigger information, to measure the channel quality and/or the second rank.

Optionally, the second receiving unit 702 is specifically configured to: receive uplink scheduling indication information sent by the base station, where the uplink scheduling indication information includes the indication information; or receive downlink scheduling indication information sent by the base station, where the downlink scheduling indication information includes the indication information.

Optionally, as shown in FIG. 8, the apparatus 70 further includes a measurement unit 713, configured to: measure, based on a received $M^{th}$ subframe sent by the base station, channel quality of data sent by the base station in an $(M+K)^{th}$ subframe.

The $M^{th}$ subframe includes the indication information, the target CSI-RS, and a downlink data resource allocation manner, the $(M+K)^{th}$ subframe includes a modulation and coding policy corresponding to the terminal, a quantity and locations of PRBs allocated by the base station in the $M^{th}$ subframe to the target CSI-RS are the same as a quantity and locations of PRBs occupied by a data channel sent by the base station in the $(M+K)^{th}$ subframe, and both M and K are integers greater than or equal to 1.

The apparatus provided in this embodiment of the present invention may receive the resource number indicated by the base station, determine, based on the resource number, the target information from the information received on each time-frequency resource, measure the CQI based on the target information, and feed back the CQI to the base station, instead of feeding back all measured CQIs to the base station after measuring the CQIs based on the information received on all time-frequency resources. Therefore, resource consumption of the terminal is greatly reduced.

In hardware implementation, each unit of the CQI measurement apparatus 70 may be built in or independent of a processor of the CQI measurement apparatus 70 in a form of hardware, or may be stored in a memory of the CQI measurement apparatus 70 in a form of software, so that the processor invokes and performs operations corresponding to the foregoing units. The processor may be a CPU, an ASIC, or one or more integrated circuits configured to implement this embodiment of the present invention.

Figure 9:
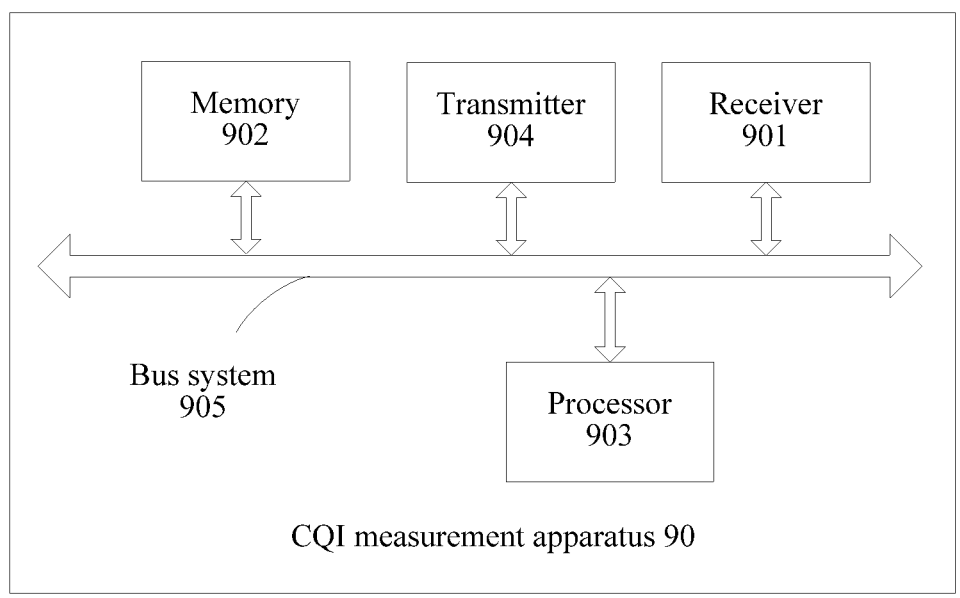
FIG. 9 is a schematic composition diagram of another CQI measurement apparatus according to an embodiment of the present invention.

An embodiment of the present invention further provides a CQI measurement apparatus 900. As shown in FIG. 9, the apparatus 900 includes a receiver 901, a memory 902, a processor 903, and a transmitter 904.

The receiver 901, the memory 902, the processor 903, and the transmitter 904 are coupled together by using a bus system 905. The memory 902 may include a random access memory, and may further include a nonvolatile memory, for example, at least one magnetic disk memory. The bus system 905 may be an ISA bus, a PCI bus, an EISA bus, or the like. The memory 902 may be classified into an address bus, a data bus, a control bus, and the like. For ease of representation, only one thick line is used in FIG. 9 for representation, but it does not indicate that there is only one bus or one type of bus.

The receiver 901 is configured to receive information sent by a base station on each time-frequency resource.

The receiver 901 is further configured to receive indication information sent by the base station. The indication information is used to indicate resource numbers of a terminal to the terminal;

The memory 902 is configured to store code, and the processor 903 performs the following actions based on the code: determining the resource numbers of the terminal based on the indication information; determining target information from the information based on the resource number of the terminal, where the target information is received information that is sent by the base station to the terminal on a time-frequency resource corresponding to the resource number of the terminal, the time-frequency resource is a resource element used to transmit a CSI-RS or a target CSI-RS, and the target CSI-RS is a precoded CSI-RS; and measuring channel quality based on the target information, and determining a CQI based on the measured channel quality.

The transmitter 904 is configured to send the CQI to the base station.

Optionally, the receiver 901 is specifically configured to: receive, on a PDCCH, the indication information sent by the base station, where resource numbers indicated by the indication information that is sent by the base station and that is received by the receiver 901 on PDCCHs in different subframes are the same or different.

Optionally, the processor 903 is further configured to determine that a quantity of resource numbers is a value of a first rank. The first rank is an initial rank determined by the base station for the terminal.

The processor 903 is further configured to: measure a second rank based on the target information and the first rank, and determine an RI based on the measured second rank. The second rank corresponding to the RI is less than or equal to the first rank.

The transmitter 904 is further configured to send the RI to the base station.

Optionally, the receiver 901 is further configured to: receive, by using RRC signaling, a resource pool sent by the base station, where the resource numbers are resource numbers of R resources included in the resource pool, one resource is corresponding to one resource number, and R is an integer greater than or equal to 2.

Optionally, the resource number is a target CSI-RS port number, a row number of an orthogonal matrix, or a column number of an orthogonal matrix, a combination of N resource elements and one code whose length is N is corresponding to one target CSI-RS port or one resource element is corresponding to one target CSI-RS port, and N is an integer greater than or equal to 2.

Optionally, the processor 903 is specifically configured to: determine the information received on the time-frequency resource corresponding to the resource number of the terminal; and despread, by using a code corresponding to the resource number of the terminal, the information received on the time-frequency resource corresponding to the resource number of the terminal, to obtain the target information.

When the resource number is a target CSI-RS port number, the code corresponding to the resource number is a code whose length is N and that is corresponding to the target CSI-RS port; or when the resource number is a row number of an orthogonal matrix, the code corresponding to the resource number is a row element corresponding to the row number; or when the resource number is a column number of an orthogonal matrix, the code corresponding to the resource number is a column element corresponding to the column number.

Optionally, the processor 903 is specifically configured to: determine the resource numbers of the terminal based on R bits included in the indication information, where an $r^{th}$ bit in the R bits is used to indicate whether to allocate an $r^{th}$ resource in the R resources to the terminal, R is an integer greater than or equal to 2, and r is an integer greater than or equal to 1 and less than or equal to R; or determine the resource numbers of the terminal based on values of 3 bits included in the indication information; or determine the resource numbers of the terminal based on values of 4 bits included in the indication information.

Optionally, the receiver 901 is further configured to receive trigger information sent by the base station; and the processor 903 is further configured to determine, based on the trigger information, to measure the channel quality and/or the second rank.

Optionally, the receiver 901 is specifically configured to: receive uplink scheduling indication information sent by the base station, where the uplink scheduling indication information includes the indication information; or receive downlink scheduling indication information sent by the base station, where the downlink scheduling indication information includes the indication information.

Optionally, the processor 903 is further configured to: measure, based on a received $M^{th}$ subframe sent by the base station, channel quality of data sent by the base station in an $(M+K)^{th}$ subframe.

The $M^{th}$ subframe includes the indication information, the target CSI-RS, and a downlink data resource allocation manner, the $(M+K)^{th}$ subframe includes a modulation and coding policy corresponding to the terminal, a quantity and locations of PRBs allocated by the base station in the $M^{th}$ subframe to the target CSI-RS are the same as a quantity and locations of PRBs occupied by a data channel sent by the base station in the $(M+K)^{th}$ subframe, and both M and K are integers greater than or equal to 1.

The apparatus provided in this embodiment of the present invention may receive the resource number indicated by the base station, determine, based on the resource number, the target information from the information received on each time-frequency resource, measure the CQI based on the target information, and feed back the CQI to the base station, instead of feeding back all measured CQIs to the base station after measuring the CQIs based on the information received on all time-frequency resources. Therefore, resource consumption of the terminal is greatly reduced.

In the several embodiments provided in this application, it should be understood that the disclosed apparatus and method may be implemented in other manners. For example, the described apparatus embodiment is merely an example. For example, the module division is merely logical function division and may be other division in actual implementation. For example, a plurality of modules or components may be combined or integrated into another system, or some features may be ignored or not performed.

The modules described as separate parts may or may not be physically separate, and parts displayed as modules may or may not be physical modules, may be located in one position, or may be distributed on a plurality of network units. Some or all of the units may be selected based on actual requirements to achieve the objectives of the solutions of the embodiments.

In addition, functional modules in the embodiments of the present invention may be integrated into one processing module, or two or more modules may be integrated into one module. The integrated module may be implemented in a form of hardware, or may be implemented in a form of hardware in addition to a software functional module.

When the foregoing integrated module is implemented in a form of a software functional module, the integrated module may be stored in a computer-readable storage medium. The software functional module is stored in a storage medium and includes several instructions for instructing a computer device (which may be a personal computer, a server, a network device, or the like) to perform some steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

What is claimed is:

1. A channel quality index (CQI) measurement method, comprising:
   determining, by a base station, a target channel state information-reference signal (CSI-RS) on each time-frequency resource of time-frequency resources corresponding to resource numbers of a terminal, wherein each determined target CSI-RS is a precoded CSI-RS, and each time-frequency resource of the time-frequency resources is a resource element used to transmit at least one determined target CSI-RS, wherein each resource number of the resource numbers of the terminal is respectively a target CSI-RS port number, a row number of an orthogonal matrix, or a column number of an orthogonal matrix, wherein a combination of N resource elements and one code whose length is N corresponds to one target CSI-RS port, or one resource element corresponds to one target CSI-RS port, and wherein N is an integer greater than or equal to 2;
   determining, by the base station, a first rank and a precoding matrix of the terminal;
   allocating, by the base station, the resource numbers of the terminal to the terminal based on the first rank, wherein a quantity of the resource numbers of the terminal is the same as a value of the first rank;
   performing, by the base station for each resource number of the resource numbers of the terminal, spectrum spreading on the respective CSI-RS corresponding to the respective resource number using a code corresponding to the respective resource number;
   precoding, by the base station using the precoding matrix, each CSI-RS obtained after spectrum spreading, to obtain the target CSI-RS sent on each of the time-frequency resources corresponding to the resource numbers of the terminal, wherein:
      when the respective resource number is a target CSI-RS port number, the code corresponding to the respective resource number is a code whose length is N and that corresponds to the target CSI-RS port; or
      when the respective resource number is a row number of an orthogonal matrix, the code corresponding to the respective resource number is a row element corresponding to the row number; or
      when the respective resource number is a column number of an orthogonal matrix, the code corresponding to the respective resource number is a column element corresponding to the column number;
   sending, by the base station, the respective target CSI-RS on each time-frequency resource of the time-frequency resources corresponding to the resource numbers to the terminal on the respective time-frequency resource;
   sending, by the base station, indication information to the terminal, wherein the indication information is used to indicate the resource numbers of the terminal to the terminal; and
   receiving, by the base station, the CQI sent by the terminal, wherein the CQI is used to indicate channel quality.

2. The method according to claim 1, wherein the sending, by the base station, indication information to the terminal comprises:
   sending, by the base station, the indication information to the terminal on a physical downlink control channel (PDCCH), wherein resource numbers indicated by the indication information sent by the base station to the terminal on PDCCHs in different subframes are the same or different.

3. The method according to claim 1, wherein the resource numbers of the terminal are resource numbers of R resources comprised in a resource pool, one resource is corresponding to one resource number, R is an integer greater than or equal to 2, and the resource pool is a resource pool defined by the base station, and the method further comprises:
   sending, by the base station, the resource pool to the terminal by using Radio Resource Control (RRC) signaling.

4. A channel quality index (CQI) measurement method, comprising:
   receiving, by a terminal, first information sent by a base station on each time-frequency resource of time-frequency resources corresponding to resource numbers of the terminal;
   receiving, by the terminal, indication information sent by the base station, wherein the indication information is used to indicate the resource numbers of the terminal to the terminal;
   determining, by the terminal, the first information received on each time-frequency resource of the time-frequency resources corresponding to the resource numbers of the terminal;
   de-spreading, by the terminal for each resource number of the resource numbers of the terminal, the respective first information received on the respective time-frequency resource corresponding to the respective resource number of the terminal busing a code corresponding to the respective resource number of the terminal, wherein:
      when the respective resource number is a target channel state information-reference signal (CSI-RS) port number, the code corresponding to the respective resource number is a code whose length is N and that corresponds to the target CSI-RS port; or
      when the respective resource number is a row number of an orthogonal matrix, the code corresponding to the respective resource number is a row element corresponding to the row number; or
      when the respective resource number is a column number of an orthogonal matrix, the code corresponding to the respective resource number is a column element corresponding to the column number;
   determining, by the terminal, the resource numbers of the terminal based on the indication information, wherein each resource number of the resource numbers of the terminal is respectively a target CSI-RS port number, a row number of an orthogonal matrix, or a column number of an orthogonal matrix, wherein a combination of N resource elements and one code whose length is N corresponds to one target CSI-RS port, or one resource element corresponds to one target CSI-RS port, and wherein N is an integer greater than or equal to 2;
   determining, by the terminal for each resource number of the resource numbers of the terminal, target information from the first information based on the respective resource number of the terminal, wherein the target information is received first information that is sent by the base station to the terminal on a respective time-frequency resource corresponding to the respective resource number of the terminal, and each time-frequency resource of the time-frequency resources corresponding to the resource numbers of the terminal is a resource element used to transmit at least one determined target CSI-RS, and each target CSI-RS is a precoded CSI-RS;

measuring, by the terminal, channel quality based on the target information, and determining the CQI based on the measured channel quality; and sending, by the terminal, the CQI to the base station.

5. The method according to claim 4, wherein the receiving, by the terminal, indication information sent by the base station comprises:

receiving, by the terminal on a physical downlink control channel (PDCCH), the indication information sent by the base station, wherein resource numbers indicated by the indication information that is sent by the base station and that is received by the terminal on PDCCHs in different subframes are the same or different.

6. The method according to claim 4, wherein the resource numbers of the terminal are resource numbers of R resources comprised in a resource pool, one resource is corresponding to one resource number, and R is an integer greater than or equal to 2, and the method further comprises:

receiving, by the terminal by using Radio Resource Control (RRC) signaling, the resource pool sent by the base station.

7. A channel quality index (CQI) measurement apparatus, comprising a non-transitory memory, a processor, a transmitter, and a receiver, wherein the non-transitory memory is configured to store code, and the processor is configured to execute the code to:

determine a target channel state information-reference signal CSI-RS on each time-frequency resource of time-frequency resources corresponding to resource numbers of a terminal, wherein each determined target CSI-RS is a precoded CSI-RS, and each time-frequency resource of the time-frequency resources is a resource element used to transmit at least one determined target CSI-RS, wherein each resource number of the resource numbers of the terminal is respectively a target CSI-RS port number, a row number of an orthogonal matrix, or a column number of an orthogonal matrix, wherein a combination of N resource elements and one code whose length is N corresponds to one target CSI-RS port, or one resource element corresponds to one target CSI-RS port, and wherein N is an integer greater than or equal to 2;

determine a first rank and a precoding matrix of the terminal;

allocate the resource numbers of the terminal to the terminal based on the first rank, wherein a quantity of the resource numbers of the terminal is the same as a value of the first rank:

perform, for each resource number of the resource numbers of the terminal, spectrum spreading on the respective CSI-RS corresponding to the respective resource number using a code corresponding to the respective resource number; and precode, using the precoding matrix, each CSI-RS obtained after spectrum spreading, to obtain the target CSI-RS sent on each of the time-frequency resources corresponding to the resource numbers of the terminal, wherein:

when the respective resource number is a target CSI-RS port number, the code corresponding to the respective resource number is a code whose length is N and that corresponds to the target CSI-RS port; or when the respective resource number is a row number of an orthogonal matrix, the code corresponding to the respective resource number is a row element corresponding to the row number; or when the respective resource number is a column number of an orthogonal matrix, the code corresponding to the respective resource number is a column element corresponding to the column number;

the transmitter is configured to send the respective target CSI-RS on each time-frequency resource of the time-frequency resources corresponding to the resource numbers of the terminal to the terminal;

the transmitter is further configured to send indication information to the terminal, wherein the indication information is used to indicate the resource numbers of the terminal to the terminal; and the receiver is configured to receive the CQI sent by the terminal, wherein the CQI is used to indicate channel quality.

8. The apparatus according to claim 7, wherein the transmitter is specifically configured to:

send the indication information to the terminal on a physical downlink control channel (PDCCH), wherein resource numbers indicated by the indication information sent by the transmitter to the terminal on PDCCHs in different subframes are the same or different.

9. A channel quality index (CQI) measurement apparatus, comprising a receiver, a non-transitory memory, a processor, and a transmitter, wherein the receiver is configured to receive first information sent by a base station on each time-frequency resource of time-frequency resources corresponding to resource numbers of a terminal;

the receiver is further configured to receive indication information sent by the base station, wherein the indication information is used to indicate the resource numbers of the terminal to the terminal;

the non-transitory memory is configured to store code, and the processor is configured to execute the code to:

determine the first information received on each time-frequency resource of the time-frequency resources corresponding to the resource numbers of the terminal; and de-spreading, for each resource number of the resource numbers of the terminal, the respective first information received on the respective time-frequency resource corresponding to the respective resource number of the terminal using a code corresponding to the respective resource number of the terminal, wherein:

when the respective resource number is a target CSI-RS port number, the code corresponding to the respective resource number is a code whose length is N and that corresponds to the target CSI-RS port; or when the respective resource number is a row number of an orthogonal matrix, the code corresponding to the respective resource number is a row element corresponding to the row number; or when the respective resource number is a column number of an orthogonal matrix, the code corresponding to the respective resource number is a column element corresponding to the column number;

determining the resource numbers of the terminal based on the indication information, wherein each resource number of the resource numbers of the terminal is respectively a target CSI-RS port number, a row number of an orthogonal matrix, or a column number of an orthogonal matrix, wherein a combination of N resource elements and one code whose length is N corresponds to one target CSI-RS port, or one resource element corresponds to one target CSI-RS port, and wherein N is an integer greater than or equal to 2;

determining, for each resource number of the resource numbers of the terminal, target information from the first information based on the respective resource number of the terminal, wherein the target information is received first information that is sent by the base station to the terminal on a respective time-frequency resource corresponding to the respective resource number of the terminal, each time-frequency resource of the time-frequency resources corresponding to the resource numbers of the terminal is a resource element used to transmit a at least one determined target CSI-RS, and each target CSI-RS is a precoded CSI-RS; and measuring channel quality based on the target information, and determining the CQI based on the measured channel quality; and the transmitter is configured to send the CQI to the base station.

10. The apparatus according to claim 9, wherein the receiver is specifically configured to:

receive, on a physical downlink control channel (PDCCH), the indication information sent by the base station, wherein resource numbers indicated by the indication information that is sent by the base station and that is received by the receiver on PDCCHs in different subframes are the same or different.

* * * * *

UNITED STATES PATENT AND TRADEMARK OFFICE
CERTIFICATE OF CORRECTION

PATENT NO. : 10,735,056 B2
APPLICATION NO. : 16/126331
DATED : August 4, 2020
INVENTOR(S) : Ruiqi Zhang et al.

It is certified that error appears in the above-identified patent and that said Letters Patent is hereby corrected as shown below:

In the Claims

In Column 37, Line 39, Claim 7, delete "CSI-RS" and insert --(CSI-RS)--.

Signed and Sealed this
Twenty-seventh Day of October, 2020

Andrei Iancu
*Director of the United States Patent and Trademark Office*